United States Patent
Singh et al.

(10) Patent No.: US 12,349,091 B2
(45) Date of Patent: Jul. 1, 2025

(54) SELECTING PROPAGATION DELAY COMPENSATION FOR TIME-SENSITIVE NETWORK (TSN) INFORMATION

(71) Applicant: Telefonaktiebolaget LM Ericsson (publ), Stockholm (SE)

(72) Inventors: Bikramjit Singh, Raasepori (FI); John Walter Diachina, Garner, NC (US); Magnus Sandgren, Staffanstorp (SE); Magnus Larsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 17/921,197

(22) PCT Filed: May 7, 2021

(86) PCT No.: PCT/SE2021/050434
§ 371 (c)(1),
(2) Date: Oct. 25, 2022

(87) PCT Pub. No.: WO2021/225511
PCT Pub. Date: Nov. 11, 2021

(65) Prior Publication Data
US 2023/0171725 A1    Jun. 1, 2023

(51) Int. Cl.
H04W 56/00 (2009.01)
H04J 3/06 (2006.01)
(52) U.S. Cl.
CPC ....... *H04W 56/0045* (2013.01); *H04J 3/0638* (2013.01); *H04W 56/009* (2013.01)
(58) Field of Classification Search
None
See application file for complete search history.

(56) References Cited

U.S. PATENT DOCUMENTS

2010/0118895 A1  5/2010 Radulescu
2018/0242268 A1  8/2018 Rune et al.
(Continued)

FOREIGN PATENT DOCUMENTS

CN  105743599 A  7/2016
CN  109891957 A  6/2019
(Continued)

OTHER PUBLICATIONS

"3GPP TR 23.734 V16.1.0", 3rd Generation Partnership Project; Technical Specification Group Services and System Aspects; Study on enhancement of 5G System (5GS) for vertical and Local Area Network (LAN) services (Release 16), Mar. 2019, pp. 1-111.
(Continued)

*Primary Examiner* — Saumit Shah
(74) *Attorney, Agent, or Firm* — Murphy, Bilak & Homiller, PLLC

(57) ABSTRACT

Embodiments include methods for a network node in a RAN to support timestamping of time-sensitive network (TSN) messages received by a UE. Such methods include sending one of the following information to the UE for use in timestamping of TSN messages: a second indication of one of multiple available downlink propagation delay (DL PD) compensation methods that is selected by the network node the UE; or a DL PD compensation value, determined by the network node based on one of the available DL PD compensation methods selected by the UE on a different one of the available DL PD compensation methods selected by the network node for the UE. Such methods also include sending, to the UE proximately after sending the information, an indication of a system clock time, associated with the RAN, to be compensated by the UE based on the information.

18 Claims, 14 Drawing Sheets

(56) References Cited

U.S. PATENT DOCUMENTS

| | | | |
|---|---|---|---|
| 2019/0150141 A1 | 5/2019 | Irukulapati et al. | |
| 2020/0322908 A1 | 10/2020 | Prakash et al. | |
| 2021/0345272 A1* | 11/2021 | Chatterjee | H04W 56/0045 |
| 2022/0239398 A1* | 7/2022 | Li | H04W 56/0015 |
| 2023/0068462 A1* | 3/2023 | Moon | H04W 56/001 |
| 2023/0141032 A1* | 5/2023 | Awad | H04W 56/0015 370/350 |
| 2023/0413204 A1* | 12/2023 | Babaei | H04W 56/0045 |

FOREIGN PATENT DOCUMENTS

| | | |
|---|---|---|
| WO | 2020081062 A1 | 4/2020 |
| WO | 2020093000 A1 | 5/2020 |
| WO | 2020183014 A1 | 9/2020 |
| WO | 2021066730 A1 | 4/2021 |
| WO | 2021066732 A1 | 4/2021 |
| WO | 2021181363 A1 | 9/2021 |
| WO | 2021198070 A1 | 10/2021 |

OTHER PUBLICATIONS

"IEC/IEEE 60802—Time-Sensitive Networking Profile for Industrial Automation", IEC/IEEE (Joint Dev) 60802, 2019, pp. 1-49.

"3GPP TS 38.133 V16.3.0", 3rd Generation Partnership Project; Technical Specification Group Radio Access Network; NR; Requirements for support of radio resource management (Release 16), Mar. 2020, pp. 1-1169.

"On Downlink Delay Compensation", 3GPP TSG-RAN WG2 #107bis Tdoc, R2-1912549, Chongqing, China, Oct. 14-18, 2019, pp. 1-3.

"SIB and RRC-unicast delivery in reference time provisioning", 3GPP TSG-RAN WG2 #105bis, Tdoc R2-1904041, Xi'an, China, Apr. 8-12, 2019, pp. 1-8.

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.

"3GPP TS 38.133 V16.0.0", 3rd Generation Partnership Project; Technical Specification Group Radio Access Network; NR; Requirements for support of radio resource management (Release 16), Jun. 2019, pp. 1-999.

"Analysis of Time Synchronization Accuracy over Uu Interface", 3GPP TSG RAN WG1 Ad-Hoc Meeting 1901, Tdoc R1-1900181, Taipei, Taiwan, Jan. 21-25, 2019, pp. 1-5.

"Enhancements for support of time synchronization", 3GPP TSG-RAN WG2 #111e, Tdoc R2-2006701, Electronic meeting, Aug. 17-28, 2020, pp. 1-5.

"Other Enhancements to Uplink and Downlink Transmissions for NR URLLC—Response to Incoming LS", 3GPP TSG-RAN WG1 Meeting #98, Tdoc R1-1908127, Prague, CZ, Aug. 26-30, 2019, pp. 1-10.

"On the usage of rateRatio, one-step vs two-step sync operation and dedicated QoS Flow", SA WG2 Meeting #S2-134. 82-1908317, (revision of S2-1907758), Sapporo, JP, Jun. 24-28, 2019, pp. 1-6.

Mahmood, Aamir, et al., "Time Synchronization in 5G Wireless Edge: Requirements and Solutions for Critical-MTC", arXiv:1906.06380v1 [cs.IT], https://www.researchgate.net/publication/333842214, Jun. 2019, pp. 1-8.

"Reply LS on propagation delay compensation for reference time information delivery", 3GPP TSG-RAN WG1#98, R1-1909906, Prague, CZ, Aug. 26-30, 2019, pp. 1-2.

"Cambridge Dictionary definition of Association", <https://dictionary.cambridge.org/us/dictionary/english/association>, 2025, 1 page.

\* cited by examiner

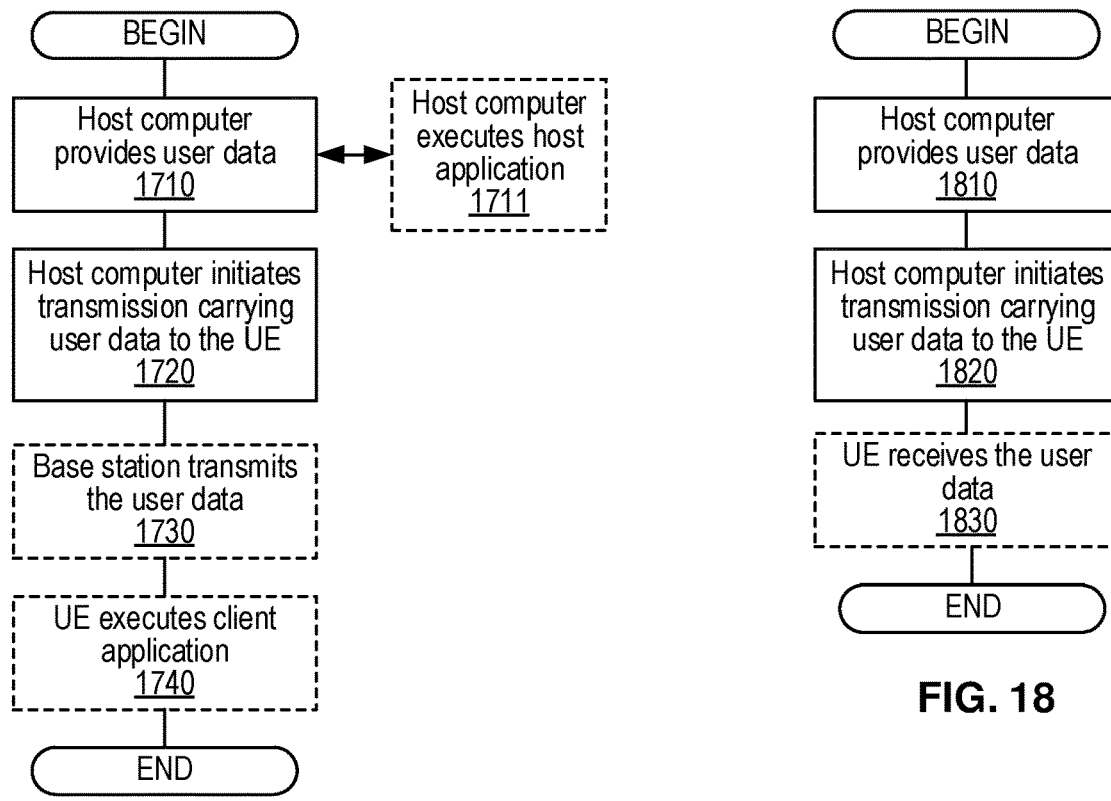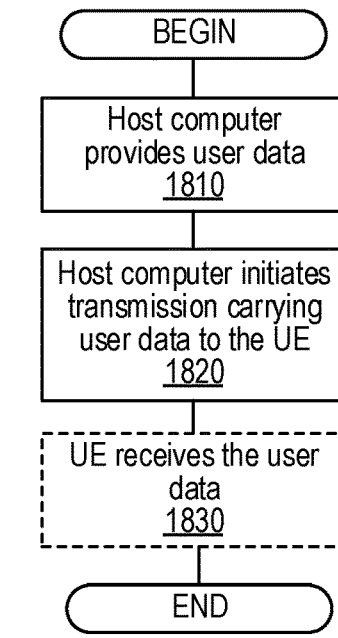
FIG. 17
FIG. 18
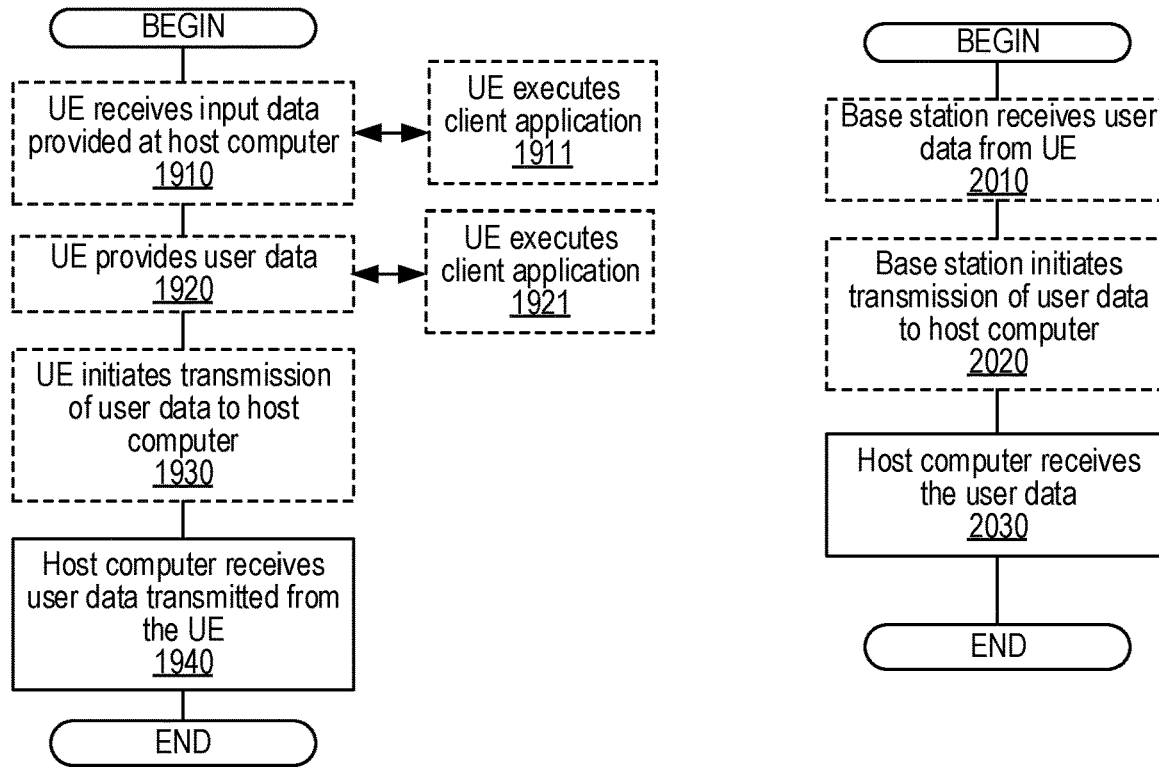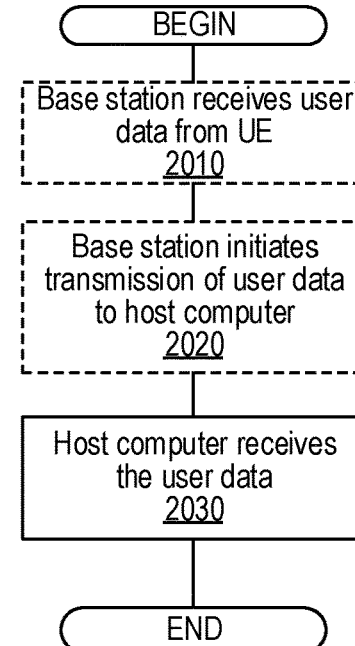
FIG. 19
FIG. 20

SELECTING PROPAGATION DELAY COMPENSATION FOR TIME-SENSITIVE NETWORK (TSN) INFORMATION

TECHNICAL FIELD

The present application relates generally to the field of wireless networks and more specifically to techniques for compensating for signal propagation delays between a wireless network and wireless devices, particularly when a wireless network and a wireless device are utilized to deliver highly accurate timing information from a time-sensitive network (TSN).

BACKGROUND

Industry 4.0 is a term that often refers to automation and data exchange in manufacturing. It can include concepts and/or technologies such as cyber-physical systems, the Internet of Things (IoT), cloud computing, and cognitive computing. Industry 4.0 is also referred to as the fourth industrial revolution or "I4.0" for short.

One scenario or use case for Industry 4.0 is the so-called "smart factory". Within modular structured smart factories, cyber-physical systems monitor physical processes, create a virtual copy of the physical world, and make decentralized decisions. Over the Internet of Things (IoT), cyber-physical systems communicate and cooperate with each other, and with humans, in real-time both internally and across organizational services offered and used by participants of a value chain of which the smart factory is a part. Such smart factory environment environments are also referred to as Industrial Internet of Things (IIoT).

There are four common principles associated with Industry 4.0. First, "interoperability" requires the ability to connect machines, devices, sensors, and people to communicate with each other via the IoT or, alternatively, the "Internet of People" (IoP). Second, "information transparency" requires information systems to have the ability to create a virtual copy of the physical world by enriching digital models (e.g., of a smart factory) actual with sensor data. For example, this can require the ability to aggregate raw sensor data to higher-value context information.

Third, "technical assistance" requires assistance systems to be able to support humans by aggregating and visualizing information comprehensively for making informed decisions and solving urgent problems on short notice. This principle can also refer to the ability of cyber physical systems to physically support humans by conducting a range of tasks that are unpleasant, too exhausting, or unsafe for their human co-workers. Finally, cyber physical systems should have the ability to make decentralized decisions and to perform their tasks as autonomously as possible. In other words, only in the case of exceptions, interferences, or conflicting goals, should tasks be delegated to a higher level.

These principles associated with Industry 4.0 support various use cases that place many requirements on a network infrastructure. Use cases include simpler ones such as plant measurement to more difficult ones such as precise motion control in a robotized factory cell. To address these requirements, the IEEE 802.1 working group (particularly, task group TSN) has developed a Time Sensitive Networking (TSN) standard. TSN is based on the IEEE 802.3 Ethernet standard, a wired communication standard that is designed for "best effort" quality of service (QoS). TSN describes a collection of features intended to make legacy Ethernet performance more deterministic, including time synchronization, guaranteed low-latency transmissions, and improved reliability. The TSN features available today can be grouped into the following categories (shown below with associated IEEE specifications):

Time Synchronization (e.g., IEEE 802.1AS);
Bounded Low Latency (e.g., IEEE 802.1Qav, IEEE 802.1Qbu, IEEE 802.1Qbv, IEEE 802.1Qch, IEEE 802.1Qcr);
Ultra-Reliability (e.g., IEEE 802.1CB, IEEE 802.1Qca, IEEE 802.1Qci);
Network Configuration and Management (e.g., IEEE 802.1Qat, IEEE 802.1Qcc, IEEE 802.1Qcp, IEEE 802.1CS).

FIGS. 1-2 are block diagrams that respectively illustrate Centralized and Fully Centralized TSN configuration models, as specified in IEEE Std. 802.1Qbv-2015. Within a TSN network, the communication endpoints are called "Talker" and "Listener." All the switches and/or bridges between a Talker and a Listener must support certain TSN features, such as IEEE 802.1AS time synchronization. A "TSN domain" includes all nodes that are synchronized in the network, and TSN communication is only possible within such a TSN domain.

The communication between Talker and Listener is in streams. Each stream is based on data rate and latency requirements of an application implemented at both Talker and Listener. A Talker initializes a stream towards a Listener, and the TSN configuration and management features are used to set up the stream and to guarantee the stream's requirements across the network. Some TSN features require a central management entity called Centralized Network Configuration (CNC), as shown in FIG. 1. The CNC can use, for example, Netconf and YANG models to configure the switches in the network for each TSN stream. This also facilitates the use of time-gated queueing (defined in IEEE 802.1Qbv) that enables data transport in a TSN network with deterministic latency. With time-gated queueing on each switch, queues are opened or closed according to a precise schedule thereby allowing high-priority packets to pass through with minimum latency and jitter. Of course, packets must arrive at a switch ingress port before the gate is scheduled to be open.

The fully centralized model shown in FIG. 2 also includes a Centralized User Configuration (CUC) entity used as a point of contact for Listener and Talker. The CUC collects stream requirements and endpoint capabilities from the devices and communicates with the CNC directly. Further details about TSN configuration are given in IEEE 802.1Qcc.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-reliable low-latency communications (URLCC), device-to-device (D2D), and other use cases related to IIoT and/or Industry 4.0.

At a high level, the 5G network architecture consists of a Next Generation radio access network (NG-RAN) and a 5G core network (5GC). The NG-RAN includes various gNodeB's (gNBs, also referred to as base stations) serving cells by which wireless devices (also referred to as user equipment, or UEs) communicate. The gNBs can be connected to the 5GC via one or more NG interfaces, and can be connected to each other via one or more Xn interfaces.

Each of the gNBs can support frequency division duplexing (FDD), time division duplexing (TDD), or a combination thereof.

FIG. 3 is a block diagram illustrating an exemplary division of the 5G network architecture into control plane (CP) and data (or user) plane (UP) functionality. For example, a UE can communicate data packets to a device and/or application on an external network (e.g., the Internet) by sending them via the NG-RAN (e.g., the serving gNB) to a user plane function (UPF) in the 5GC, which provides an interface from the 5GC to external networks.

CP functionality can operate cooperatively with the UP functionality. CP functions shown in FIG. 3 include an access management function (AMF), a session management function (SMF), a network exposure function (NEF), a policy control function (PCF), a network repository function (NRF), and a unified data management (UDM) function. The AMF can communicate with the RAN via an N2 logical interface, which can be carried over the NG interface from the gNB to the 5GC. Similarly, the UPF can communicate with the SMF via the N4 logical interface.

To support IIoT uses cases, a 5G network (e.g., NG-RAN and 5GC) should be capable of delivering highly accurate timing information from an external TSN network to TSN endpoints connected to the 5G network, e.g., via UEs. FIG. 4 is a block diagram illustrating an exemplary arrangement for interworking between the 5G network architecture shown in FIG. 3 and an exemplary fully centralized TSN network architecture. In the following discussion, a device connected to the 5G network is referred to as 5G endpoint, and a device connected to the TSN domain is referred to as TSN endpoint. The arrangement shown in FIG. 4 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

The TSN can include a grandmaster clock (TSN GM) that serves as the definitive timing source for TSN endpoints. At a high level, the 5G network in FIG. 4 should appear to the connected TSN as a switch or bridge that delivers the TSN GM timing to the connected endpoints in compliance with the requirements in IEEE 802.1AS. However, the 5G network does not use the TSN GM as its own timing source, but instead relies on a 5G system clock (5GSC) that is distributed among the various network nodes or functions. As such, one or more timing relationships between TSN GM and 5GSC may need to be determined and/or derived to facilitate transit of the TSN GSM to the connected end station in a compliant manner.

One problem that arises in determining these timing relationships is the radio frequency (RF) propagation delay (PD) of the signal from the gNB to the UE connected to the TSN endpoint (see, e.g., FIG. 4), which is proportional to the radio frequency (RF) distance between gNB and UE. For example, a UE that is 300 m distant from the gNB antenna will experience a propagation delay of approximately one microsecond. Note that the propagation distance may be greater than the geographical (or line-of-sight, LOS) distance due to reflections of the signal from obstacles positioned between the gNB and the UE. The propagation distance may also be referred to as a "RF distance". When used herein in relation to PD, "distance" refers to propagation distance unless expressly stated otherwise.

As such, even if the gNB provides the UE with a 5GSC time, the TSN time derived by the UE may be inaccurate (e.g., offset) by the amount of the PD. Put differently, a TSN-5GSC timing relationship is only accurate up to the point of transmission of the TSN message by the gNB, e.g., at the gNB's transmission antenna(s). Furthermore, UEs may experience PDs that vary with time as the distance to the serving gNB changes and/or the serving gNB changes. Likewise, different UEs served by the same gNB may experience different PDs.

The inaccuracy of the TSN time derived by the UE can create various problems for connected endpoints in the TSN domain. For example, certain IIoT devices in a factory may have strict accuracy requirements on the time delivered by the TSN network, such that violations of the requirements could result in harm to workers and/or factory operations. Although certain techniques have been proposed to compensate for PD between gNB and UE, these techniques suffer from various problems, difficulties, and/or issues, particularly with respect to mobile UEs whose PDs may change over time. As such, there is a need for improved techniques that can facilitate a UE to determine the proper PD compensation for TSN delivery at any given time.

SUMMARY

Embodiments of the present disclosure provide specific improvements to time-sensitive networking (TSN) in a wireless environment, such as by facilitating solutions to overcome the exemplary problems summarized above and described in more detail below Some embodiments include methods (e.g., procedures) for supporting timestamping of time-sensitive network (TSN) messages received by a user equipment (UE). These exemplary methods can be performed by a network node (e.g., base station, eNB, gNB, etc., or component thereof) serving the UE in a radio access network (RAN, e.g., E-UTRAN, NG-RAN).

These exemplary methods can include sending one of the following information to the UE for use in relation to timestamping of TSN messages received by the UE:
  a second indication of one of a plurality of available downlink (DL) propagation delay (PD) compensation methods that is selected by the network node for the UE;
  a DL PD compensation value, determined by the network node based on one of a plurality of available DL PD compensation methods that is selected by the UE; or
  the DL PD compensation value, determined by the network node based on a different one of the available DL PD compensation methods that is selected by the network node for the UE.

These exemplary methods can also include sending, to the UE proximately after sending the information, an indication of a system clock time associated with the RAN, wherein the system clock time is to be compensated by the UE based on the information.

In some embodiments, these exemplary method can also include sending, to the UE proximately after sending the indication of system clock time, a TSN message indicating a time associated with a grandmaster clock of the TSN (TSN GM). In some of these embodiments, at least one of the following applies:
  the information is sent no earlier than a first duration before sending the indication of the system clock time, and
  the indication of the system clock time is sent no earlier than a second duration before sending the TSN message.

In such embodiments, these exemplary methods can also include determining at least one of the first and second durations based on one or more of the following:
- TSN timing accuracy requirements of a TSN end station connected to the UE;
- the UE's current location and/or movement in a cell served by the network node;
- radio propagation conditions in the cell;
- network node measurements of UE uplink (UL) transmissions;
- UE measurements of network node DL transmissions;
- UE processing capabilities in relation to at least one of the information, the indication of the system clock time, and the TSN message; and
- scheduled transmissions of at least one of the indication of the system clock time and the TSN message.

In some of these embodiments, the TSN message is one of a plurality of periodic TSN GM signalling events pertaining to an end station associated with the UE and the indication of the system clock time is one of a corresponding plurality of periodic indications of system clock time sent to the UE. In such embodiments, each indication of system clock time is sent at a same duration before a corresponding TSM GM signaling event.

In some embodiments, these exemplary methods can also include receiving, from the UE, a first indication of the DL PD compensation method that is selected by the UE. In such embodiments, the information is sent to the UE in response to the first indication. In some embodiments, the second indication indicates a different DL PD compensation method than indicated by the first indication.

In some embodiments, these exemplary methods can also include determining the DL PD compensation value based on the DL PD compensation method selected by the UE or the different DL PD compensation method selected by the network node for the UE. For example, this determined value can be sent to the UE.

In some embodiments, the indication of system clock time can be sent via broadcast system information or unicast signaling to the UE, and the information can be sent via unicast signaling to the UE.

In various embodiments, the plurality of available DL PD compensation methods can include at least two of the following: zero compensation; fixed non-zero compensation of a first amount; fixed non-zero compensation of a second amount; and variable compensation based on round-trip-time of signal propagation between UE and network node.

In some embodiments, these exemplary methods can also include selecting one of the plurality of available DL PD compensation methods for the UE based on the UE's current position in relation to a plurality of coverage areas of the network node and/or on respective ranges of DL PD compensation values corresponding to the plurality of available DL PD compensation methods.

In some of these embodiments, the selecting operations can include, when the UE is currently using a first DL PD compensation method in a first coverage area served by the network node, selecting a second DL PD compensation method associated with the first coverage area based on one or more of the following:
- the UE's proximity to a second coverage area served by the network node;
- difference between a first PD compensation value computed based on the first DL PD compensation method and a second PD compensation value computed based on the second DL PD compensation method;
- difference between the first PD compensation value and a pre-defined threshold; and
- a rate of change of first PD compensation values determined based on the first DL PD compensation method.

In other of these embodiments, the selecting operations can include, when a first DL PD compensation value determined according to a first DL PD compensation method is outside of a range corresponding to the first DL PD compensation method, selecting a second DL PD compensation method having a corresponding range that includes the first DL PD compensation value.

In some embodiments, these exemplary methods can also include configuring the UE with a mapping between the plurality of available DL PD compensation methods and a corresponding plurality of identifier values. In such embodiments, the second indication can include an identifier value associated with the DL PD compensation method selected by the network node. In some of these embodiments, the mapping can also include an association between each available DL PD compensation method and one or more coverage areas of a cell served by the network node.

Other embodiments include methods (e.g., procedures) for timestamping of TSN messages received by a UE served by a network node in a RAN. These exemplary methods can be performed by a UE (e.g., wireless device).

These exemplary methods can include receiving one of the following information from the network node:
- a second indication of one of a plurality of available DL PD compensation methods that is selected by the network node for the UE;
- a DL PD compensation value, determined by the network node based on one of a plurality of available DL PD compensation methods that is selected by the UE; or
- the DL PD compensation value, determined by the network node based on a different one of the available DL PD compensation methods that is selected by the network node for the UE.

These exemplary methods can also include receiving, from the network node proximately after receiving the information, an indication of a system clock time associated with the RAN. These exemplary methods can also include timestamping a TSN message, received from the network node, based on the indicated system clock time and a DL PD compensation value determined using the received information.

In some embodiments, the TSN message indicates a time associated with a grandmaster clock of the TSN (TSN GM), and the indication of the system clock time is received proximately before the TSN message. In some of these embodiments, the TSN message is one of a plurality of periodic TSN GM signalling events pertaining to an end station associated with the UE and the indication of the system clock time is one of a corresponding plurality of periodic indications of system clock time received by the UE. In such embodiments, each indication of system clock time is received at a same duration before a corresponding TSM GM signaling event.

In some embodiments, these exemplary methods can also include sending, to the network node, a first indication of the DL PD compensation method that is selected by the UE. In such embodiments, the information is received from the network node in response to the first indication. In some embodiments, the second indication indicates a different DL PD compensation method than indicated by the first indication.

In some embodiments, these exemplary methods can also include determining the DL PD compensation value based on the DL PD compensation method selected by the UE or the different DL PD compensation method selected by the network node for the UE. For example, this determined value can be used for the timestamping operation. In some embodiments, determining the DL PD compensation value can be further based on UE adjustments to timing of UL transmissions and/or DL PD information provided by the network node.

In some embodiments, the indication of system clock time can be received from the network node via broadcast system information or unicast signaling, and the information can be received from the network node via unicast signaling.

In various embodiments, the plurality of available DL PD compensation methods can include any of those mentioned above in the summary of network node embodiments.

In some embodiments, these exemplary methods can also include selecting one of the plurality of available DL PD compensation methods based on the UE's current position in relation to a plurality of coverage areas of the network node and/or on respective ranges of DL PD compensation values corresponding to the plurality of available DL PD compensation methods.

In some of these embodiments, the selecting operations can include, when the UE is currently using a first DL PD compensation method in a first coverage area served by the network node, selecting a second DL PD compensation method associated with the first coverage area based on one or more of the following:
  the UE's proximity to a second coverage area served by the network node;
  difference between a first PD compensation value computed based on the first DL PD compensation method and a second PD compensation value computed based on the second DL PD compensation method;
  difference between the first PD compensation value and a pre-defined threshold; and
  a rate of change of first PD compensation values determined based on the first DL PD compensation method.

In other of these embodiments, the selecting operations can include, when a first DL PD compensation value determined according to a first DL PD compensation method is outside of a range corresponding to the first DL PD compensation method, selecting a second DL PD compensation method having a corresponding range that includes the first DL PD compensation value.

In some embodiments, these exemplary methods can also include receiving, from the network node, a mapping between the plurality of available DL PD compensation methods and a corresponding plurality of identifier values. In such embodiments, the second indication can include an identifier value associated with the DL PD compensation method selected by the network node. In some of these embodiments, the mapping can also include an association between each available DL PD compensation method and one or more coverage areas of a cell served by the network node.

In some embodiments, these exemplary methods can also include selecting a further one of the available DL PD compensation methods to use in relation to timestamping of TSN messages received from a further network node in the RAN; receiving, from the further network node, an indication of a further system clock time associated with the RAN; and timestamping a further TSN message, received from the further network node, based on the further system clock time and a DL PD compensation value determined based on the selected further DL PD compensation method. In some of these embodiments, the network node and the further network node are associated with different system clock domains of the RAN and one of the following applies:
  the UE is in multi-connectivity with the network node and the further network node; or
  the UE is handed over from the network node to the further network node.

Other embodiments include network nodes (e.g., base stations, eNBs, gNBs, etc., or components thereof) and UEs configured to perform operations corresponding to any of the exemplary methods described herein. Other embodiments include non-transitory, computer-readable media storing program instructions that, when executed by processing circuitry of such network nodes or UEs, configure the same to perform operations corresponding to any of the exemplary methods described herein.

These and other embodiments can improve accuracy and/or reduce uncertainty of relationships between a 5GSC and a TSN GM, and thereby facilitate compliance with end-to-end accuracy requirements for delivery of TSN time information from TSN GM clocks to remotely located end stations connected to a 5G network. This can be particularly beneficial for IIoT devices in a factory setting that may have strict accuracy requirements for which violation could result in harm to workers and/or factory operations.

These and other objects, features, and advantages of embodiments of the present disclosure will become apparent upon reading the following Detailed Description in view of the Drawings briefly summarized below.

BRIEF DESCRIPTION OF THE DRAWINGS

FIGS. 17-20 are flow diagrams illustrating exemplary methods and/or procedures implemented in a communication system, according to various exemplary embodiments of the present disclosure.

DETAILED DESCRIPTION

Figure 1:
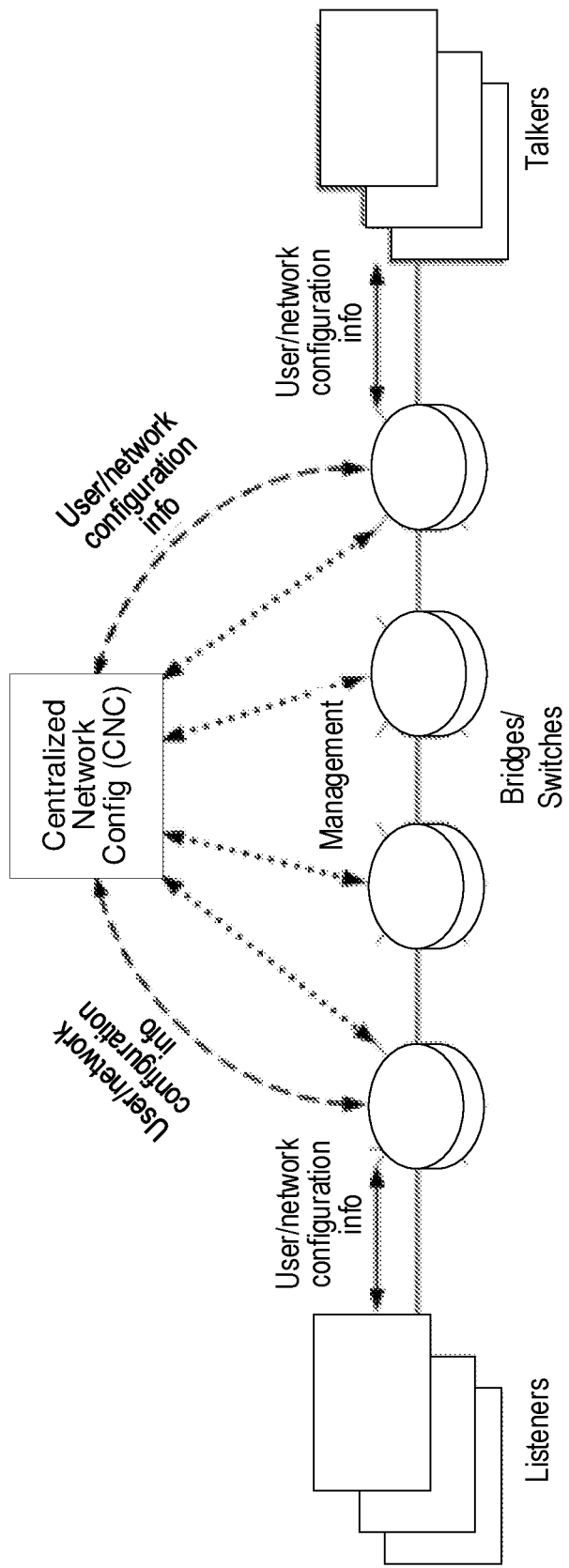
FIG. 1 is a block diagram illustrating a Centralized Time-Sensitive Networking (TSN) configuration model, as specified in IEEE 802.1Qbv-2015.
Figure 2:
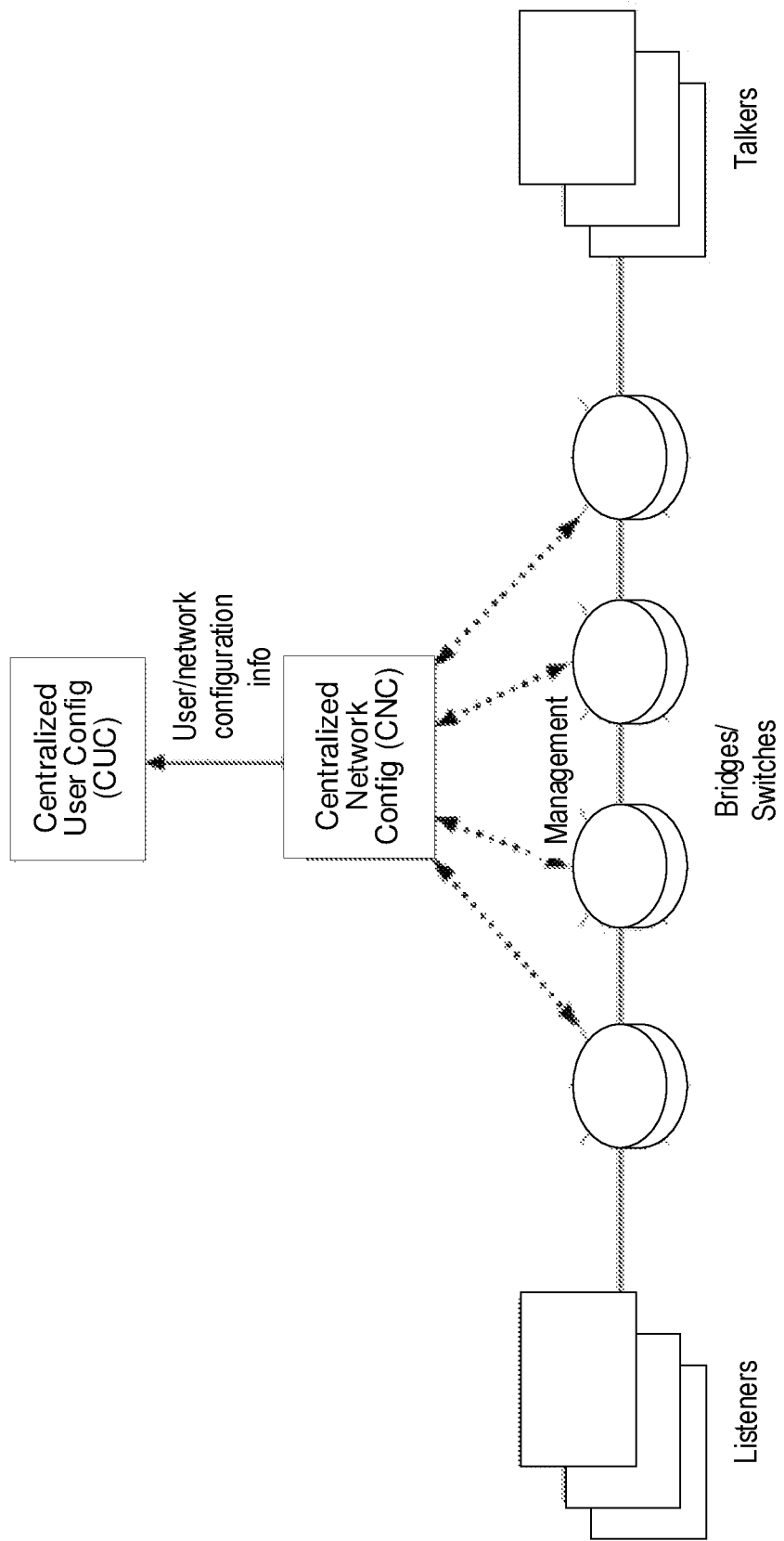
FIG. 2 is a block diagram illustrating a Fully Centralized TSN configuration model, as specified in IEEE 802.1Qbv-2015.
Figure 3:
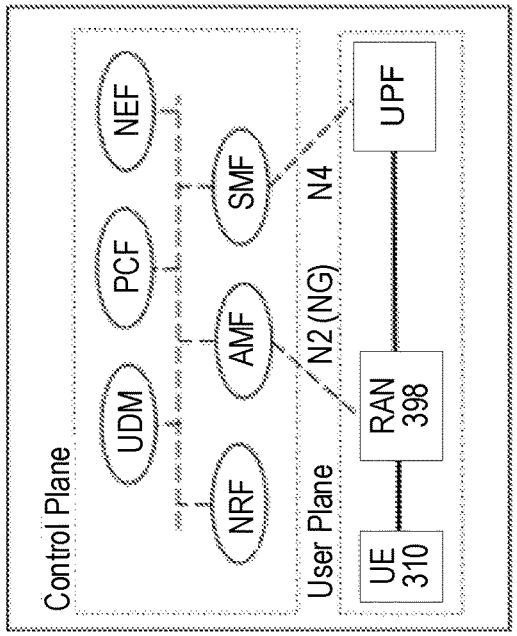
FIG. 3 is a block diagram illustrating an exemplary control plane (CP) and a data (or user) plane (UP) architecture of an exemplary 5G wireless network.
Figure 4:
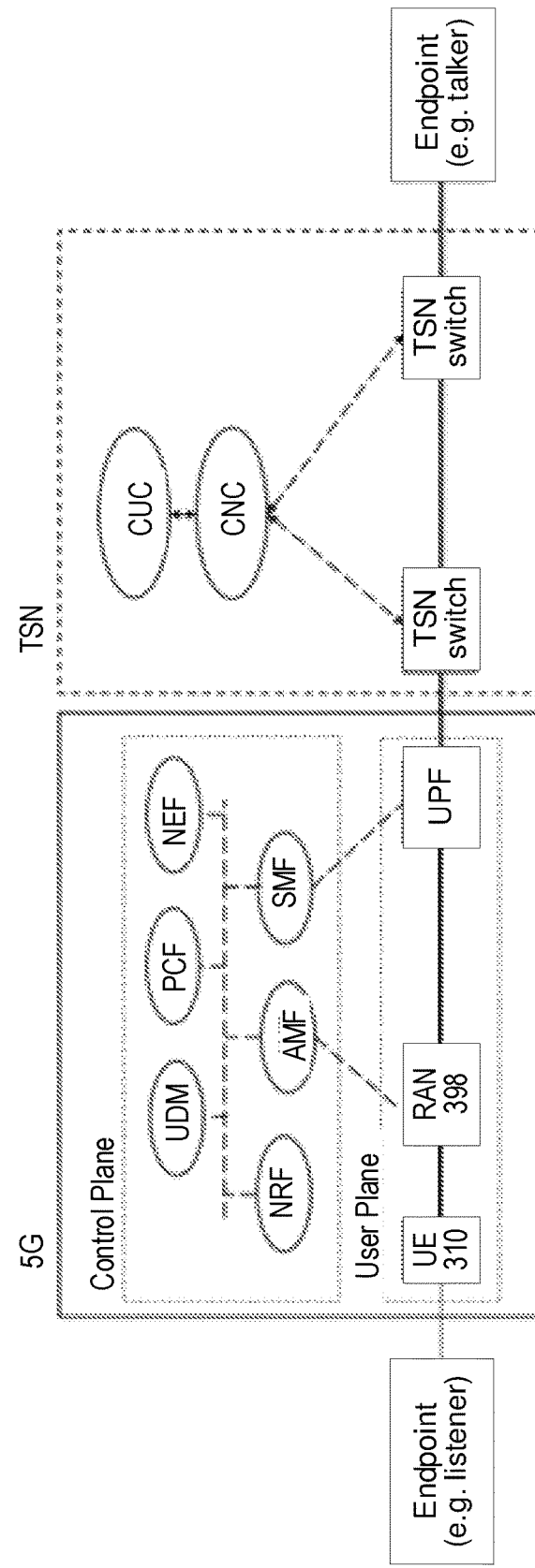
FIG. 4 is a block diagram illustrating an exemplary arrangement for interworking between the 5G network architecture shown in FIG. 3 and an exemplary fully centralized TSN network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, 5G networks can be used to deliver timing references from a source to an endpoint in a time-sensitive network (TSN). For example, the endpoint may be connected to a UE that receives wireless signals from a serving gNB in the 5G network, with an inherent propagation delay (PD) due to a propagation distance between the gNB and the UE. This PD can cause inaccuracies in the TSN time derived by the UE and delivered to the connected TSN endpoint(s). Furthermore, such TSN timing inaccuracies can create various problems for the endpoints and/or IIoT devices connected to the endpoints that have strict accuracy requirements on the time delivered by the TSN network. Various techniques proposed to address such problems suffer from various drawbacks and/or issues, particularly with respect to mobile UEs whose PDs may change over time. This is discussed in more detail below.

Figure 5:
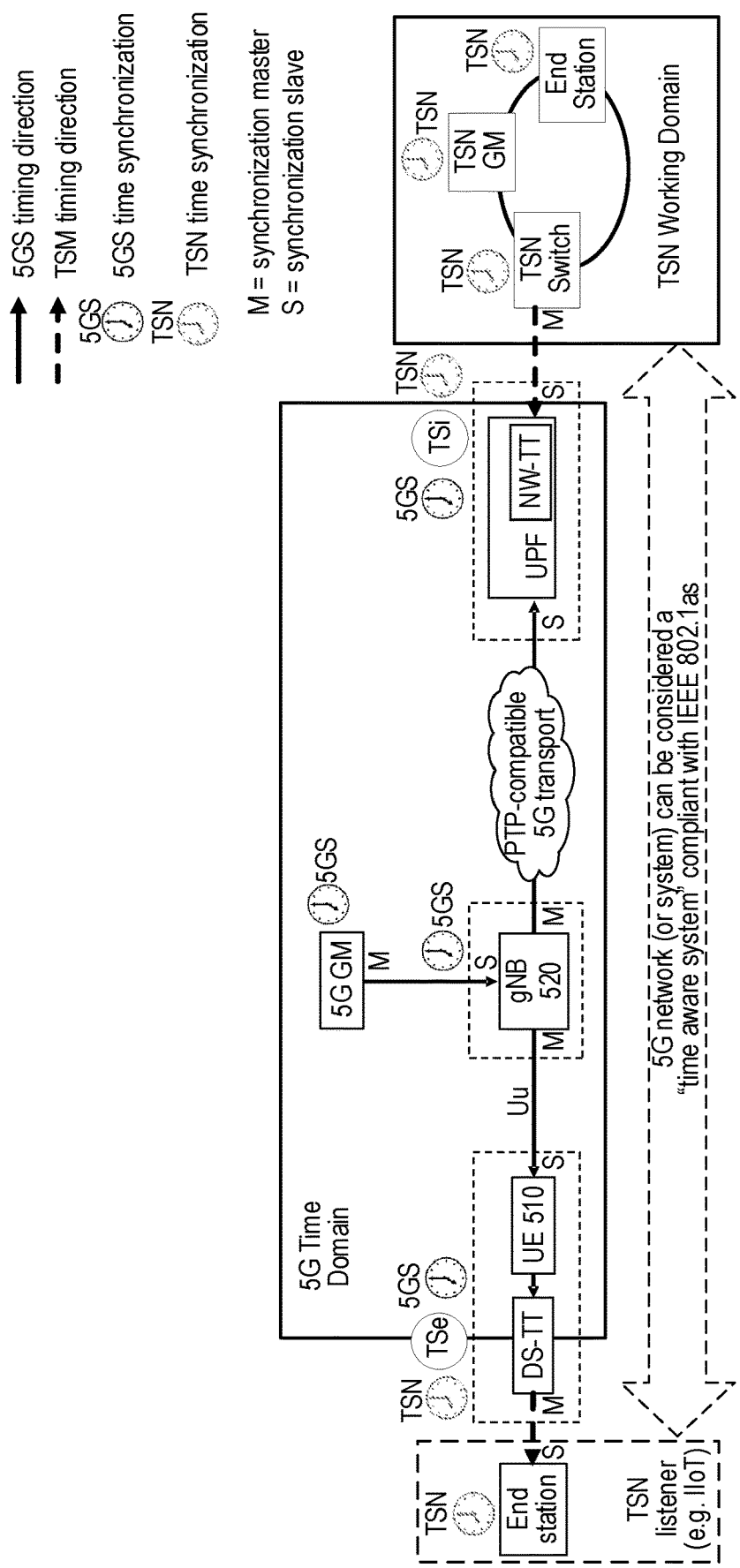
FIG. 5 is a high-level block diagram of an exemplary arrangement in which a 5G network delivers timing references from a time-sensitive network (TSN) to TSN end stations connected to the 5G network, according to various exemplary embodiments of the present disclosure.

FIG. 5 is a high-level block diagram of an exemplary arrangement in which a 5G network delivers timing references from a TSN network to TSN end stations connected to the 5G network. The TSN source network is shown as a TSN Working Domain that includes a TSN GM, an end station, and a TSN Switch. In this exemplary arrangement, the 5G network is integrated with the external TSN network as a TSN bridge, such as shown in other figures described above. Furthermore, in this arrangement, the 5G network can be modelled as an IEEE 802.1AS compliant entity; for TSN synchronization, the end-to-end 5G network can be considered as an IEEE 802.1AS "time-aware system".

However, only the TSN Translators (TTs) at the edges of the 5G network need to support the IEEE 802.1AS operations. This includes a network side TSN translator (NW-TT) at the user plane function (UPF) and a device-side TSN translator (DS-TT) at the UE. Ingress timestamping ("TSi") is performed by the NW-TT when an external TSN clock (e.g., timing) signal is received from the TSN Working Domain. Likewise, egress timestamping ("TSe") is performed by the DS-TT when that TSN clock signal arrives at a UE and is forwarded to the DS-TT. In addition to ingress and egress timestamping, the TTs can support other 802.1AS functions such as generalized precision time protocol (gPTP), Best Master Clock Algorithm (BMCA), rateRatio, etc.

More specifically, upon reception of a downlink gPTP message, the NW-TT makes an ingress timestamp (TSi) for each gPTP event (Sync) message. The UPF then forwards the gPTP message from TSN network to the UEs via all UPF-terminated PDU sessions that the UEs have established to the TSN network. All gPTP messages are transmitted on a quality of service (QoS) flow that complies with the residence time upper bound requirement specified in IEEE 802.1AS. The UE receives the gPTP messages and forwards them to the DS-TT. The DS-TT then makes an egress timestamp (TSe) for the gPTP event (Sync) messages for the TSN domain (e.g., the endpoints).

The difference between TSi and TSe reflects the residence time of the gPTP message within the 5G network, expressed in 5GSC time. Put differently, if gPTP message indicating TSN time "X" is stamped with 5G system clock (5GSC) time "Y" at ingress and 5GSC time "Z" at egress, the end stations can adjust TSN time "X" delivered to the end station by the residence time Z-Y. More specifically, the DS-TT calculates and adds the measured residence time between the TTs into the Correction Field (CF) of each gPTP event (Sync) message. As such, the relative accuracy of the 5GSC measured between ingress and egress is essential for accurate TSN GM clock timing information delivered over 5G networks.

In the 5G network, the UE, the gNB, the UPF, the NW-TT, and the DS-TT are synchronized with a grandmaster 5GSC ("5G GM" in FIG. 5), either directly or indirectly. In general, the 5GSC is made available to all UP nodes in the 5G network via a PTP-compatible transport network. Likewise, 5GSC is made available to UEs via signaling of absolute timing of radio frames. In FIG. 5, solid lines are used to denote flow of 5GSC synchronization between respective synchronization master ("M") and slave ("S") elements in the 5G network. Likewise, dashed lines are used to denote flow of TSN GM synchronization between respective synchronization master ("M") and slave ("S") elements in the TSN domain. In general, the two synchronization processes can be independent from each other and the gNB only needs to be synchronized to the 5GSC.

The timestamping is based on the 5G system clock and the accuracy of delivering this clock to a UE is improved by allowing the PD experienced when sending a TSN (e.g., gPTP) message from a gNB to a UE to be more precisely determined. Such improvements can be beneficial, particularly in view of additional inaccuracies that can occur during UE distribution of TSN clock to IIoT end stations to enable TSN functionalities such as Time-Aware Scheduling of IIoT device operations in the working domain.

At present, how to determine which UEs need to receive 5G system clock information is left to gNB implementation (i.e., standardized methods do not yet exist). Furthermore, other non-specified operations include determining how (e.g., which method to use) to provide 5GSC information to UEs requiring it (e.g., broadcast or unicast), and determining a particular method that a UE should use to determine a downlink PD compensation to apply to the 5GSC information received from a gNB.

The 3GPP Timing Advance command (see 3GPP TS 38.133) is used for UE uplink transmission synchronization. This may be needed due to changes in the UE propagation environment and/or propagation distance between the UE and the serving base station (e.g., gNB). At connection setup, an absolute timing correction is communicated to a UE using a medium access control (MAC) random access response (RAR) element. After connection setup, a relative timing correction can be sent to a UE using a MAC control element (CE).

The downlink (DL) propagation delay (PD) can be estimated for a given UE by (a) summing the TA value indicated by the initial absolute TA value and all subsequent relative TA values, and (b) taking some portion of the resulting total TA value to represent DL-only delays. For example, 50% could be used assuming the downlink and uplink propagation delays are essentially the same. The estimated PD can then be used to understand time synchronization dynamics, e.g., for accurately tracking and/or compensating the value of a 5GSC at the UE side relative to the value of that clock in some other network node.

Listed below are various methods used for determining a value for the downlink PD applicable to a UE, to be used for compensating the value of the 5GSC received by the UE. In each method, various internal UE errors and network-related errors can contribute to inaccuracies of 5GSC delivery to the UE.

Method 1: No compensation needed. In this case the expected distance between the gNB antenna and the UE is small enough (e.g., <30 m) to make the applicable downlink PD either negligible or not worth trying to measure given the uncertainty errors for the 5G system clock that could be introduced thereby. In this case the inaccuracies for 5G system clock distribution related to the air interface will be dominated by the UE downlink receive timing tracking.

Method 2: Pre-compensation. In this case the distance between the gNB antenna and the UEs within a cell is small enough to enable the gNB to consider an average distance of UEs from the gNB antenna as being sufficiently accurate in view of the worst case uncertainty it can introduce. For example, an average distance of 30 m in an operational cell radius of 60 m will result in a maximum of 100 ns of error being introduced for the downlink PD. Also, here inaccuracies related to UE downlink receive timing tracking will contribute together with residual PD errors to air interface inaccuracies affecting the accuracy of the 5G system clock.

Method 3: Legacy 3GPP Timing Advance command (described above). This is a round trip time (RTT) based method and introduces ~500 ns of uncertainty when adjusting the 5GSC to account for downlink PD assuming the minimum 15 kHz Sub Carrier Spacing (SCS). However, the uncertainty will be reduced in inverse proportion to increasing SCS (e.g., 30, 60, 120, etc. kHz). However, larger cells with significant PD typically operate at lower SCS, so PD compensation using this method will be limited to ~500 ns of uncertainty for larger cells. For all RTT-based methods, relative inaccuracies between UE RX-TX can significantly contribute to inaccuracies in PD determination.

Figure 6:
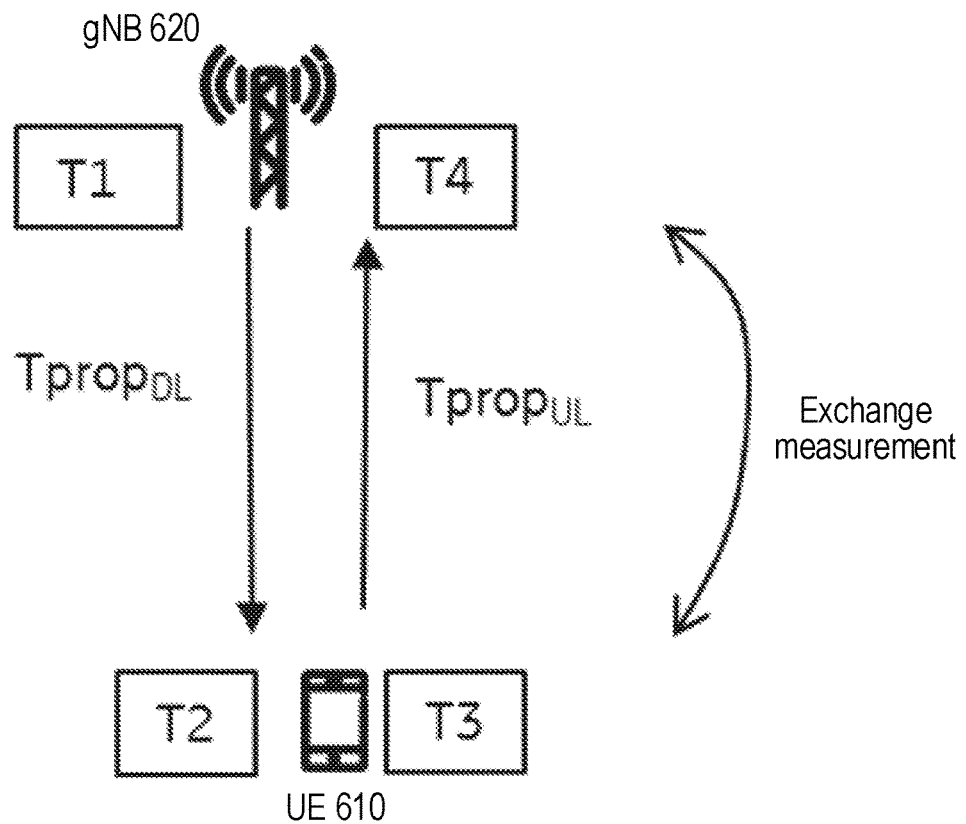
FIG. 6 illustrates an enhanced round-trip-time (RTT) determination technique, according to various exemplary embodiments of the present disclosure.

Method 4: Enhanced RTT Determination. FIG. 6 illustrates this method. The UE (610) computes a UE Tx-Rx time difference (T3-T2) and the gNB (620) computes a gNB Rx-Tx time difference (T4-T1). The UE and gNB can estimate the respective RX times based on tracking DL and UL transmissions (e.g., reference signals) by the opposite entity. The UE and gNB can exchange these values. The estimated DL PD can then be determined according to [(T4-T1)-(T3-T2)]/2. This technique can substantially reduce the uncertainty of the estimated downlink PD from the 500 ns value associated with method 3.

The particular method to use for determining DL PD compensation can also be based on UE-specific and non-UE-specific history information maintained by the gNB and/or other elements in the 5G network. For example, the 5G network will be aware of deployment characteristics like Inter Site Distances (ISD) between gNBs in the NG-RAN, general or long-term channel and/or propagation characteristics in respective cells, sizes or coverage of respective cells, maximum delays at edges of respective cells, etc. For example, the channel conditions could be known based on previous historical data and can influence the association between different PD compensation values and/or methods for different areas within a particular cell. Likewise, a historical record of PD compensation values and/or methods selected for different UEs at different positions with a cell can also influence future selection of compensation values and/or methods for UEs operating in various areas within that cell.

The particular method to use for determining DL PD compensation can also be based on UE capabilities. If this information is signaled and made available to the gNB, the gNB can make better decisions and thereby improve accuracy of 5GSC information determined by the UE and, thus, TSN end-to end clock accuracy. Such UE capabilities can include any of the following examples:

UE downlink (DL) receive tracking accuracy: An indication of UE accuracies related to receiving/tracking timing reference signal (RS) transmitted by the gNB, including bandwidth and SNR conditions. Relevant for RTT-based PD compensation.

UE internal timing accuracy: Maximum, minimum, average, and/or variance of delay between UE antenna and DS-TT. For example, strict TSN GM end-to-end accuracy requirements combined with strict 5GSC uncertainty budgets ("B") and relatively large internal UE errors (or error uncertainties) require more accurate methods for determining PD compensation to ensure the total uncertainty budget is satisfied.

UE receive to transmit (Rx-TX) relative timing accuracy: Maximum, minimum, average, and/or variance of differences between UE receive timing and transmit timing. Relevant for RTT-based methods.

PD compensation selection capability. For example, whether the UE supports an enhanced RTT based delay compensation capability or other advanced PD compensation techniques.

The particular method to use for determining DL PD compensation can also be based on characteristics of QoS flows used by the 5G network to carry the TSN information. In particular, the 5GC is expected to identify which UEs need which TSN clock information and to identify which 5G QoS flow(s) is dedicated to supporting the transmission of this information. The 5GC can provide this information to gNBs such that once a gNB knows that a UE requires a TSN clock information, it implicitly knows that UE requires the 5GSC for performing ingress/egress timestamping in relation to determining 5G network residence time of the TSN clock information.

In addition, each TSN GM is expected to have an associated synchronization accuracy (uncertainty) attribute which must be satisfied to ensure applications using that TSN GM clock transmit user plane payload with acceptable synchronization accuracy in the time domain. This requires that a gNB be able to determine a TSN GM clock synchronization accuracy and use this knowledge to determine the most appropriate method for providing downlink PD compensation information to UEs requiring TSN timing information based on that TSN GM clock. In general, more accurate PD compensation applied to the 5GSC received at the UE improves the DS-TT timestamping accuracy and, accordingly, the accuracy of the TSN timing information delivered to end stations.

Time sensitive communications (TSC) QoS Flows in the 5G network use a Delay Critical guaranteed bit rate (GBR) resource type and TSC Assistance Information (TSCAI, e.g., as defined in 3GPP TS 23.501). The TSCAI can be provided from a service management function (SMF) to a RAN node (e.g., serving gNB) upon establishing a QoS flow for a UE. The TSCAI parameters may be set according to QoS flow-specific traffic parameters obtained from an application function (AF). In the context of the present disclosure, the AF can be associated with the TSN. The TSN AF is responsible for calculating TSCAI parameters (e.g., burst arrival time with reference to the ingress port, periodicity of bursts, and flow direction) and forwarding these parameters in a TSN QoS container to the SMF (via PCF). The TSCAI parameters associated with the QoS flow allow the gNB to schedule data radio bearer (DRB) resources towards the UE that are appropriate for transmission of TSN GM clock information carried by the QoS flow.

In some cases, the TSCAI parameters can include an "uncertainty" attribute that indicates an allowable (e.g., maximum or range) of timing inaccuracy for the radio interface between the UE and gNB, including PD. In this manner, different QoS flows can carry TSN information with different uncertainty requirements, and appropriate DRB resources can be set up accordingly for the individual QoS flows.

Figure 7:
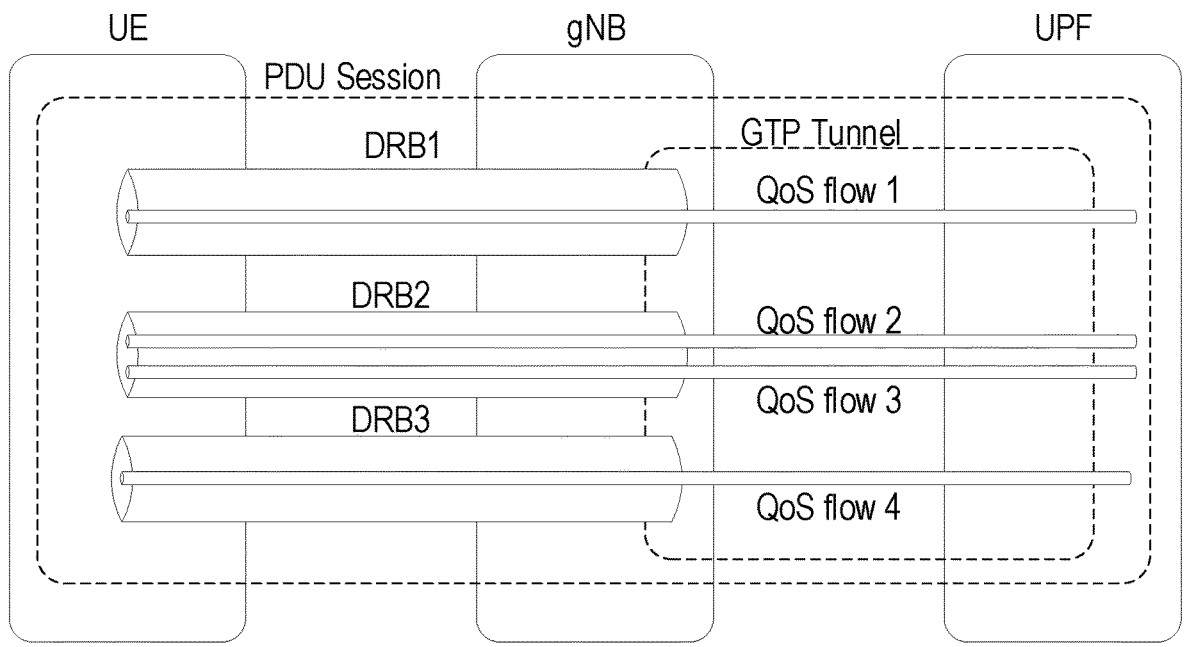
FIG. 7 is a block diagram of an exemplary PDU session between a user equipment (UE) and a user plane function (UPF) in a 5G network, according to various exemplary embodiments of the present disclosure.

The TSC QoS flow(s) and their corresponding DRB resources can be part of a PDU session between a UPF and the UE. FIG. 7 is a block diagram of an exemplary PDU session that includes three DRBs (1-3) that carry four QoS flows (1-4). As illustrated in FIG. 7, the QoS flows can also be associated with a GRPS tunneling protocol (GTP) tunnel between the UPF and the gNB. However, the GTP tunnel can be one of multiple GTP tunnels associated with the same PDU session. In some cases, particular GTP tunnels (e.g., with specific tunnel endpoint IDs (TEIDs)) may be dedicated to carrying TSN information. For example, the GTP tunnel shown in FIG. 7 can be configured in this manner. Furthermore, each of the particular GTP tunnels may be dedicated to carrying TSN information associated with an allowable (e.g., maximum or range) of timing inaccuracy. As an example, the arrangement in FIG. 7 may be extended to include additional GTP tunnels for this purpose.

Given all of the above options and possibilities, there is a need to dynamically identify the best, optimum, and/or preferred method for determining the downlink PD compensation value and/or method to be used by a particular UE at a particular time. This may be needed due to changes in any of the dependent factors mentioned above. Furthermore, such identification should be performed on a real-time basis according to UE mobility, to ensure the proper compensation method is used in conjunction with next instance of refreshing the 5GSC needed by a UE (e.g., for determining residence time for TSN information in the 5G network). As such, there is a need for techniques to determine the most suitable time for a UE to receive or trigger a request for refreshed 5GSC information. Likewise, there is a need for techniques to determine the most suitable time for a UE to inform a gNB of a new UE-selected method for determining the downlink PD, or when a gNB should autonomously determine and/or update the PD compensation method to be used for a particular UE. For example, there is a need to determine when PD compensation methods can be changed in relation to an upcoming 5GSC update to a UE, and when the 5GSC update should be delivered in relation to an upcoming event (e.g., Sync) for signaling TSN time.

In other words, when a TSN GM clock is needed by a set of end stations connected to one or more UEs (or by the UEs themselves) reachable through a 5G network, the end stations typically have an end-to-end timing uncertainty requirement associated the needed TSN GM clock. This can be known by the CNC in the TSN. A portion of that end-to-end uncertainty requirement can be allocated to the 5G network delivering the TSN clock to the end stations. For example, the amount of uncertainty introduced when a TSN GM clock is relayed through the 5G network will be impacted by the accuracy of the 5GSC used for timestamping the TSN clock information at the ingress and egress points of the 5G network.

Since 5GSC information is provided to a UE in reference to the serving gNB antenna, a UE will need to compensate the received 5GSC information with the downlink (DL) PD from the gNB antenna to the UE's receiver. Various methods can be used for this DL PD compensation. For the case of cells where the DL PD value can substantially vary over time, the most suitable value is the one determined in closest time proximity to (preferably just before) the UE receiving an instance of the 5GSC information (e.g., a clock (i.e. a clock refresh).

According to various embodiments of the present disclosure, various PD compensation methods can be used and/or selected by a UE based on a set of combined conditions and/or parameters unique to the UE. Such parameters and/or conditions can include whether the DL PD is expected to be significant (e.g., based on network deployment, UE position, DL channel conditions, etc.), TSN GM clock end-to-end accuracy and/or uncertainty required by a particular UE, individual UE capabilities, characteristics of QoS flows or other resources used to deliver the TSN clock through the 5G network, etc. As such, even if two UEs are connected to same gNB and located at same position within the cell, they might best be served by different PD determination methods according to their individual TSN end-to end timing accuracy requirements and/or their individual capabilities. Furthermore, since UEs are mobile and since activated TSN related services could change, the most suitable method for determining DL PD used to adjust a 5GSC can be change over time for a single UE.

Exemplary embodiments of the present disclosure address these and other needs, problems, and/or shortcomings of prior solutions by facilitating a network (e.g., 5G, or nodes/functions therein) to select a best, optimal, most efficient, and/or preferred method for determining downlink PD for each particular UE at any given time, from among a plurality of options available for each particular UE. The network can select such a method (referred to generically as "optimal") based on accessing and analyzing any of the information described above (or in the following) that is relevant for the particular UE at the particular time (referred to generically as "dependent parameters"). More specifically, the particular time can be based on (e.g., proximately before) a next instance of refreshing the 5GSC used by that UE and/or a next instance of TSN time information to be delivered to end station(s) via the 5G network and the particular UE. In this manner, embodiments improve accuracy and/or reduced uncertainty of relationships between 5GSC and TSN GM, and thereby facilitate compliance with end-to-end accuracy requirements for delivery of TSN time information from TSN GM clocks to remotely located end stations connected to a 5G network.

In various embodiments, the UE can autonomously determine and apply the DL PD compensation method, or the gNB can determine the DL PD compensation method and signal it to the UE. For example, a UE can autonomously switch between no compensation and fixed/static compensation methods, but a gNB may need to determine and instruct the UE to apply an RTT-based method. Either of these determinations can be based on dependent parameters such as synchronization uncertainty requirements, propagation conditions or other radio characteristics, UE mobility, UE capabilities, etc. For example, a UE can be utilizing a "no compensation" method close to the centre of a cell and then switch to a different compensation method (e.g., pre-compensation or RTT-based) as it moves further out towards the cell edge.

For very strict synchronization accuracy requirements, where the time to switch between PD compensation methods is critical, it is generally too late for the gNB to ask UE to switch to a new PD compensation method when the UE starts violating the known synchronization accuracy requirements. Hence, the switching to any method should occur proactively, whereby an appropriate PD method is selected by the UE (or the network) proximately before an instance of a 5GSC refresh for the UE by the network. This pro-active approach is preferable to a reactive selection of a PD compensation method after a 5GSC transmission, which can lead to an unacceptable level of uncertainty being introduced when egress time stamping is performed using outdated 5GSC timing information derived using an outdated PD compensation method.

In other words, a UE should switch to a method for determining DL PD compensation as soon as it determines that method is optimal, so long as the following conditions are met: 1) the selected method will not violate the applicable synchronization accuracy target (e.g., uncertainty budget); 2) the selected method is performed in close time proximity (as technically feasible) before an upcoming 5GSC refresh for the UE, and (3) the 5GSC refresh is performed in close time proximity (as technically feasible) before an upcoming TSN GM clock signalling event for the UE. In this manner, the TSN GM clock delivered to the end station(s) can be corrected according to time stamping performed using the most recently received and compensated 5GSC.

In various embodiments, the PD compensation method can be selected according to any of the following high-level procedures:

gNB asks UE to select a particular PD compensation method (which may or may not involve handshaking signalling over the radio interface) or use a specific downlink PD compensation value.

UE autonomously selects a particular PD compensation method or PD compensation value.

UE indicates to a gNB that a particular PD compensation method or PD compensation value should be used, e.g., via RRC signalling. The gNB can accept or reject UE's choice of PD method or compensation value, and respond (e.g., via RRC signaling) to the UE indicating an acceptance, a rejection, or a rejection with a new method or value.

For example, a pre-compensation or RTT-based method can be used to provide a UE with DL PD information at time t0. The UE adjusts the current value for its received 5GSC using this DL PD, begins using the adjusted 5GSC for making residence time-based adjustments to all TSN GM clock values it subsequently receives. In this example, the UE is also moving from the center towards the edge of its serving cell (i.e., increasing distance from gNB) in the period after t0. As such, the gNB should proactively determine the optimal PD compensation method for the UE to use in relation to its next 5GSC refresh and subsequent adjustments of TSN clock information received. This can be particularly necessary if end stations connected to the UE have very precise TSN GM clock synchronization requirements.

In other embodiments, a UE can proactively and/or autonomously determine and switch to an optimal method for determining PD compensation without having to be commanded to do so by a serving gNB. By doing this a UE can help ensure that the synchronization accuracy target of a TSN GM clock it distributes (to one or more end stations connected to it) will not be violated whenever it adjusts that clock to take into account the 5G network residence time. A TSN GM clock should therefore be adjusted to reflect the most recently determined residence time value, which is determined using the most recently received 5GSC refresh that is adjusted according to a very recently determined PD compensation value.

In various embodiments, the gNB can determine when to transmit 5GSC information to a UE that utilizes such information for residence time adjustments to TSN information delivered to end stations in a TSN. As mentioned above, the residence time adjustment is based on an ingress timestamp (TSi) by the NW-TT at the UPF and on an egress timestamp (TSe) by the DS-TT at the UE. The accuracy of TSe depends on the accuracy of the UE's knowledge of 5GSC, which must be refreshed periodically or occasionally. The serving gNB can determine when and/or how to transmit 5GSC to a particular UE according to various embodiments, described below.

For example, the gNB can provide the 5GSC to the UE in broadcast or unicast signaling. Unicast signaling can be UE-specific, while broadcast signaling can be used to provide the same 5GSC information to all UEs in a cell. In some embodiments, the 5GSC can be unicast to a particular UE less frequently than the TSN GM signaling events pertaining to that UE. For example, the periodicity of the unicast 5GSC information can be an integer multiple of the periodicity of TSN GM signaling events.

In some embodiments, the unicast signaling of 5GSC occurs proximately before (e.g., with a small negative time offset relative to) an expected TSN GM signaling event, so that the TSN GM clock can be updated based on UE timestamps made with very fresh (or recent) 5GSC timing information. The value of negative time offset can be based on the UE's capability (or implementation), such as how quickly the UE can process the received 5GSC information, update the 5GSC according to the most recently determined PD compensation value, and adjust received TSN GM information according to residence time based on a timestamp using the updated 5GSC. In some embodiments, the gNB can determine and/or infer the periodicity and/or schedule of TSN GM signalling events pertaining to an end station associated with a particular UE, and set up 5GSC refresh events for the UE according to a small negative time offset relative to (i.e., proximately before) the scheduled TSN GM signaling events.

In various embodiments, PD compensation procedures can involve UL (UE to gNB) signaling, DL (gNB to UE) signaling, or a combination of both. In one DL-only option, the delivery of PD compensation values or triggering of the procedure used to update the applicable PD compensation method can be done with the same periodicity of 5GSC delivery signalling. For example, the PD-related DL signaling can be initiated proximately before (e.g., small negative time offset) the DL signalling containing 5GSC information (e.g., broadcast or unicast). In another example, the 5GSC signaling can include information about PD compensation, such as a PD compensation value, an applicable PD compensation method, or a request for a UE to initiate UL signaling related to PD compensation.

In some embodiments, if the UE does not receive a PD compensation update during a regularly-scheduled (e.g., periodic) update occasion, the UE can continue using the most recent PD compensation value and/or method that it determined or was provided by the network. Alternately, in such a scenario, the UE can trigger a request for a PD method update/PD compensation value update.

A UE may require a finite amount of processing time to update a received TSN GM clock signal according to TSi and/or TSe made with most recent 5GSC information. In some embodiments, UEs can be classified according to how rapidly they can update the TSN GM clock given the TSi and TSe inputs based on 5GSC updated according to the most recent PD compensation method and/or value. Given such classification for each UE, the network can determine when to send 5GSC updates to the respective UEs. For example, a slower UE may require the 5GSC and PD compensation value/method relatively earlier in time than a faster UE, with respect to the same TSN signaling event.

As discussed above, the TSN GM clock provided to end stations connected to the 5G network must be updated according to ingress and egress time stamping made with the most recent 5GSC information and DL PD compensation. In general, this update should occur for each TSN timing message passed through the 5G network to the end station; these can occur periodically or occasionally (e.g., no definitive pattern or periodicity). To the extent possible, however, occasions for determining the downlink PD compensation method and/or value should be completed proximately before the initiation of a TSN GM signalling event (e.g., TSM timing message).

In some embodiments, the UE can autonomously determine the most suitable PD compensation method for the UE's current circumstances (e.g., time, location, channel conditions, etc.). In such scenarios, when the UE performs these determinations can be based on various factors. For example, if the PD compensation method determined to be currently most suitable is non-RTT based, then the PD compensation value may be static. As such, the static PD compensation value of the non-RTT PD compensation method may remain valid for many 5GSC refreshes to the UE. This may occur, for example, if the UE is connected in an area with small cell sizes. This static condition introduces the possibility of a UE reducing the frequency of determining the most suitable PD method, thereby saving UE processing power.

On the other hand, if the PD compensation method determined to be currently most suitable is RTT-based, then the PD compensation value may be dynamic. As such, the best suited PD procedure/method should be identified by the UE proximately before the next 5GSC refresh from the 5G network to the UE. This ensures that the PD compensation value used with the refreshed 5GSC information will be most accurate, leading to more accurate ingress and/or egress timestamping and more accurate measurement of 5G network residence time for TSN timing messages.

Figure 8:
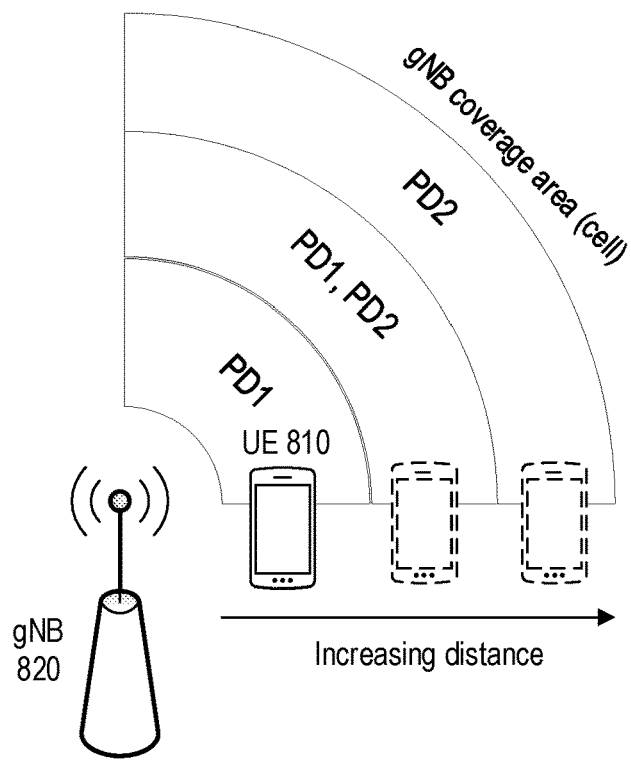
FIG. 8 shows an exemplary arrangement of three distance-based buffer regions in a cell, according to various exemplary embodiments of the present disclosure.

In some embodiments, a gNB can subdivide a served cell into a plurality of "buffer regions", with one or more PD compensation methods being used exclusively in each buffer region for satisfying synchronization accuracy requirements of a particular UE. The respective buffer regions can be based on approximate distance from the gNB to UEs within the cell. FIG. 8 shows an exemplary arrangement of three distance-based buffer regions in a cell, according to certain embodiments. In this arrangement, a UE (810) in the nearest buffer region should utilize compensation method PD1, e.g., no or fixed compensation. If the UE starts entering the middle buffer region, PD1 may become less suitable and PD2 (e.g., RTT-based) may become more suitable; in any event, both PD1 and PD2 are available in the middle buffer region. As the UE reaches the border between the middle and far buffer region, PD1 becomes unsuitable and only PD2 remains available when the UE enters the far buffer region. The reverse will occur if the UE moves back toward the serving gNB (820).

Accordingly, in such embodiments, the determination of the PD compensation method for (or by) the UE can be based on the rate of change of the determined PD value. Several variants of this technique are possible. For example, in a gNB-controlled selection, if a UE is using PD1 in the middle buffer region of FIG. 8 and its PD starts increasing on an average (e.g., as observed by the gNB according to TA), then the gNB can instruct the UE to switch to the PD2 method even though method PD1 is still applicable.

In another variant, the gNB can provide the UE with parameters for all PD compensation methods applicable in the respective buffer regions and let the UE determine the appropriate occasion for PD compensation switching. For example, in FIG. 8, if a UE is using PD1 method and finds its DL PD delay increasing above a pre-defined threshold for the near buffer region, it can switch to PD2 (e.g., based on inferring that it is in the middle buffer region where PD2 is applicable). The UE's determination of DL PD delay can be based on accumulated UL timing adjustments (e.g., TA) and/or on DL PD delay compensation data provided by the gNB on a regular basis.

Regardless of whether the UE or gNB determines when a change in PD compensation method should occur, the actual change in PD compensation method used by the UE should happen proximately before a 5GSC refresh for the UE. Otherwise a UE should not bother to initiate unnecessary signalling in an attempt to determine the optimal PD compensation method, as any method determined too much (e.g., non-proximately) before the 5GSC refresh may not be valid and/or optimal at refresh.

If a UE is using PD1 method in the middle buffer region, then signalling for switching to PD2 method can be initiated while still using PD1. This timing can prepare the UE in advance for entering the far buffer region where only PD2 is applicable. Furthermore, in some embodiments, the UE can use the difference in DL PD compensation values produced by PD1 and PD2 as an indication of when to switch to PD2 (e.g., when PD2 becomes consistently larger than PD1 by some predetermined amount). For example, using while using fixed compensation as PD1, the UE can start an RTT-based PD2 in preparation, and determine when to switch to PD2 exclusively once the differences between the compensation values produced by PD1 and PD2 differ by a predetermined amount.

Figure 9:
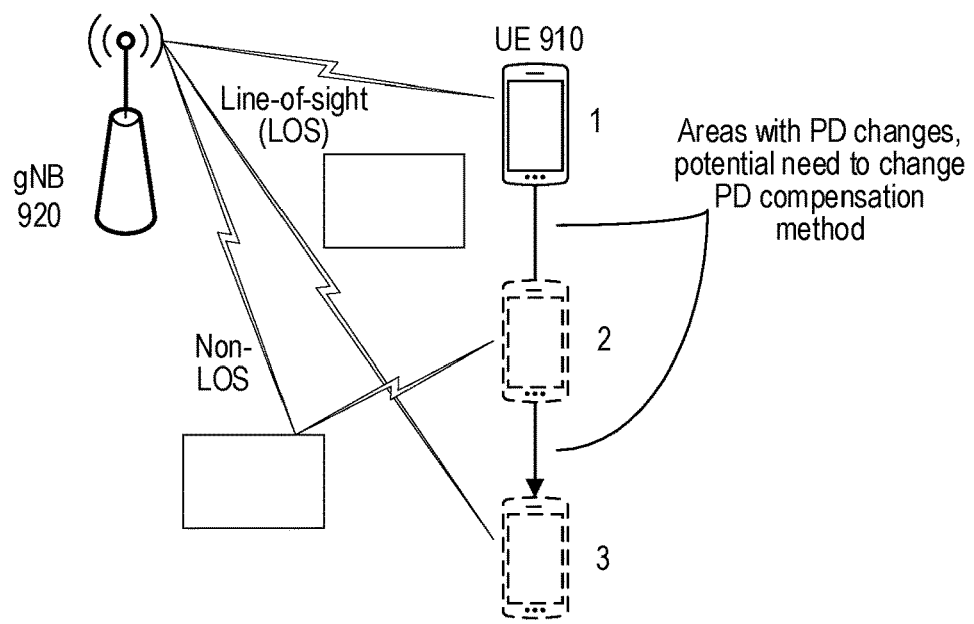
FIG. 9 illustrates an exemplary scenario with three coverage areas within a cell (i.e., two line of sight (LOS) and one non-LOS), according to various exemplary embodiments of the present disclosure.

In some embodiments, when multiple PD compensation coverage areas are supported in a cell (e.g., a relatively large cell), the switching between different PD compensation methods can be based on changes in channel conditions that occur when a UE moves within the cell coverage area. The different channel conditions and their corresponding regions within the cell coverage area can be known by the network based on historical data (e.g., drive testing, past UE reports of radio resource measurements, etc.). A UE's current position and/or current measurements (e.g., RSRP, SNR, etc.) can be used to determine when the UE may be entering a region in the cell where a change in PD compensation method should occur. FIG. 9 illustrates a scenario with three coverage areas within a cell—two line of sight (LOS) and one non-LOS. As the UE (910) moves from LOS to NLOS coverage area (or vice versa), the actual PD may change due to increase (decrease) in signal propagation distance from gNB (920) to UE. As such, detecting when the UE is transiting between coverage area can indicate a need to switch PD compensation methods (e.g., from fixed to RTT-based, or vice versa).

A dual connectivity (DC) framework was introduced in Long Term Evolution (LTE) Rel-12. Dual connectivity refers to a mode of operation in which a UE, in RRC_CONNECTED state, consumes radio resources provided by at least two different network points connected to one another with a non-ideal backhaul. In LTE, these two network points may be referred to as a "Master eNB" (MeNB) and a "Secondary eNB" (SeNB). More generally, master node (MN), anchor node, and MeNB can be used interchangeably, and the terms secondary node (SN), booster node, and SeNB can be used interchangeably. DC can be viewed as a special case of carrier aggregation (CA), where the aggregated carriers (or cells) are provided by network nodes that are physically separated and not connected via a robust, high-capacity connection.

DC is also envisioned as an important feature for 5G networks. Several DC (or more generally, multi-connectivity) scenarios have been considered for NR. These include NR-DC that is similar to LTE-DC discussed above, except that both the MN and SN (e.g., gNBs) employ the NR radio interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

In some embodiments, if a UE is connected to two or more cells, then the UE can be provided with PD compensation parameters from some or all of the connected cells. One example scenario is handover, where a UE can prepare to switch to the PD method for the target cell even before actual handover occurs or when the handover procedure is triggered in the source cell. If the UE is transmitting/receiving from multiple cells simultaneously (e.g., in CA or DC), then it uses the PD compensation value applicable for each of these cells. For example, a multi-connected UE can receive TSN timing messages via cells that are on different 5GSC domains. In such case, the UE should perform egress timestamping based on 5GSC information for the respective cells/domains and utilize PD compensation values for the respective cells to adjust the residence time as needed. More simply, the UE should 5GSC and PD compensation paired for each cell it is using; each PD value must relate to a specific cell's 5GSC information. In some embodiments, the network can recommend the UE to use a particular one of the cells for 5GSC operations based on differences in known/estimated 5GSC accuracy for the respective cells (e.g., different 5GSC synchronization strata).

In some embodiments, the UE can be configured with a set of PD compensation methods and associated parameters, and the network can send the UE a command indicating a particular one of the configured PD compensation methods (and associated parameters) to use. For example, the set can be pre-configured (e.g., specified in a 3GPP standard) or the set can be configured by higher-layer control signaling, such as RRC messages. Furthermore, the command can be a physical layer (PHY) downlink control information (DCI) message or a medium access control (MAC) layer control element (CE).

Tables 1-2 below show two exemplary configurations according to embodiments. In both tables, the four rows indicate different PD methods along with associated parameters. Both of two bottom rows indicate a pre-compensation method, with one based on a value "R" and the other based on a smaller value "R/2". When UE is active, and already using some compensation method, then a gNB can send the command (e.g., DCI) with an ID (first column) that corresponds to the particular PD compensation method and associated parameters to be used. For example, if the DCI indicates ID "3", then the UE discontinues using the current PD compensation method and starts using the pre-compensation method based on value 'R/2'. The gNB knows when 5GSC information will be distributed and can align DCI signaling associated with PD compensation methods to such events.

TABLE 1

| ID (in DCI/MAC CE/etc.) | PD type | Parameters | Comments |
| --- | --- | --- | --- |
| 0 | 0 | | No PD compensation |
| 1 | 1 | | RTT-based compensation |
| 2 | 2 | R | Pre-compensation |
| 3 | 2 | R/2 | |

TABLE 2

| ID (in DCI/MAC CE/etc.) | PD type with parameters |
| --- | --- |
| 0 | 0 |
| 1 | 1 |
| 2 | R |
| 3 | R/2 |

In some embodiments, a UE can be configured to use a given PD compensation method according to the applicable DL PD delay. The relationship can be pre-configured (e.g., specified in a 3GPP standard) or the relationship can be configured by higher-layer control signaling, such as RRC messages. Table 3 below shows an exemplary configuration according to these embodiments. Once (pre-)configured, the UE can switch to the appropriate PD compensation method autonomously by analyzing the delay it determines to be applicable at any point in time. Although Table 3 shows non-overlapping delay regions, other embodiments can utilize overlapping delay regions, such that two PD compensation methods could be allowed during transitions between regions.

TABLE 3

| Delay [ns] | PD type (parameters) |
| --- | --- |
| <A | PD1 |
| ≥A, <B | PD2 |
| ≥B, <C | PD3 (P1, P2) |
| ≥C, <D | PD4 (P3, P4) |

In some embodiments, a UE can select the applicable PD method based on its movement and/or a region associated with its current position within a cell. For example, if a UE is moving linearly (e.g., in a straight path), the UE can estimate the distance from the cell center and, based on the estimate distance, change the PD compensation method (e.g., as illustrated in FIG. 8-9) or update the PD value corresponding to the currently selected PD compensation method (e.g., RTT-based methods). Alternately, the UE can apply a predetermined correction to a PD compensation value if it surpasses some minimal error threshold. Alternately, instead of UE distance estimation, a gNB can indicate different PD compensation regions in a cell (e.g., by broadcast SI), and the UE can determine when it is in each region based on its own position (e.g., determined by the UE or by the network) and act accordingly.

Figure 10:
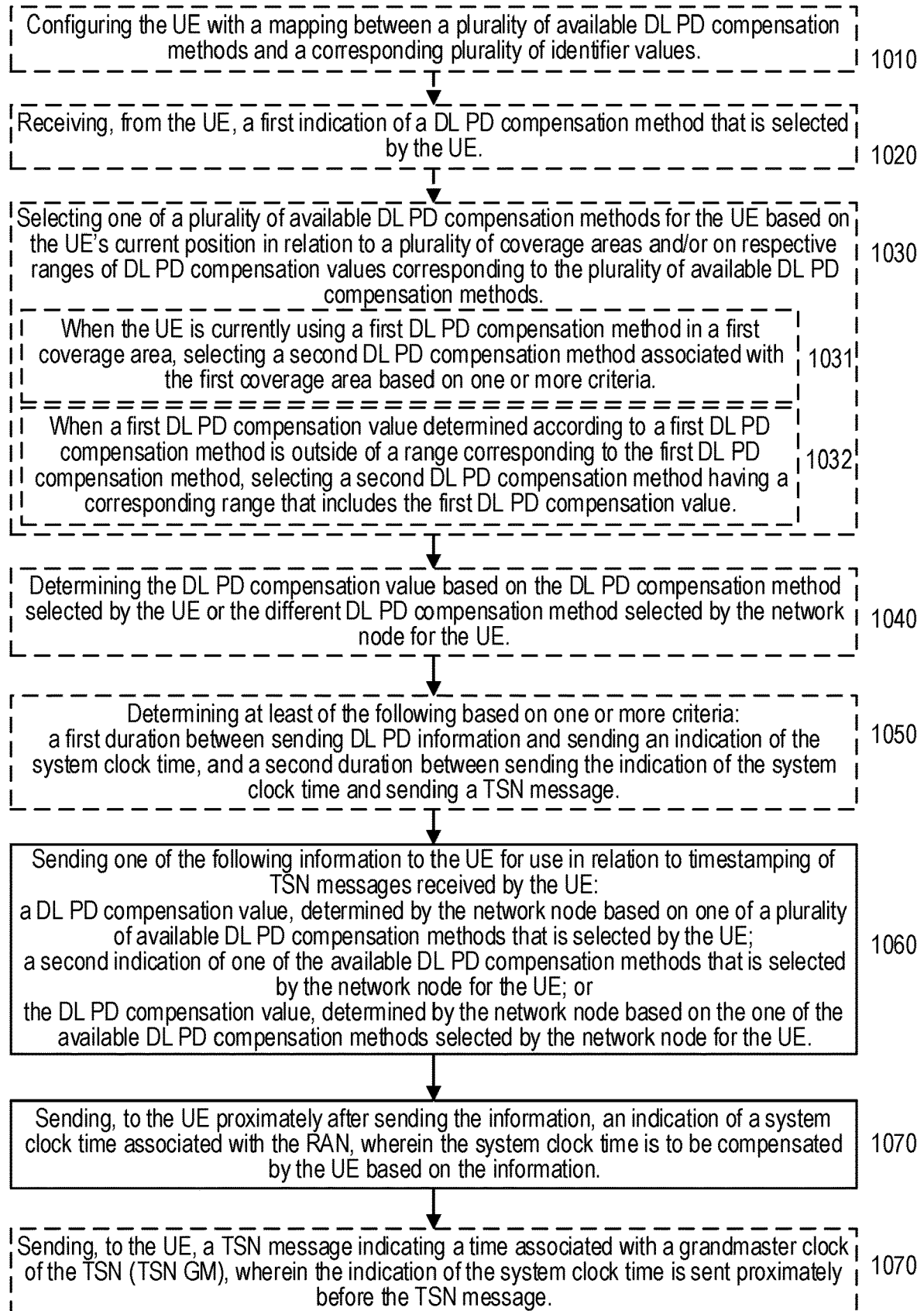
FIG. 10 shows a flow diagram illustrating an exemplary method (e.g., procedure) for a network node (e.g., base station, eNB, gNB, etc.) of a radio access network (RAN, e.g., E-UTRAN, NG-RAN), according to various exemplary embodiments of the present disclosure.
Figure 11:
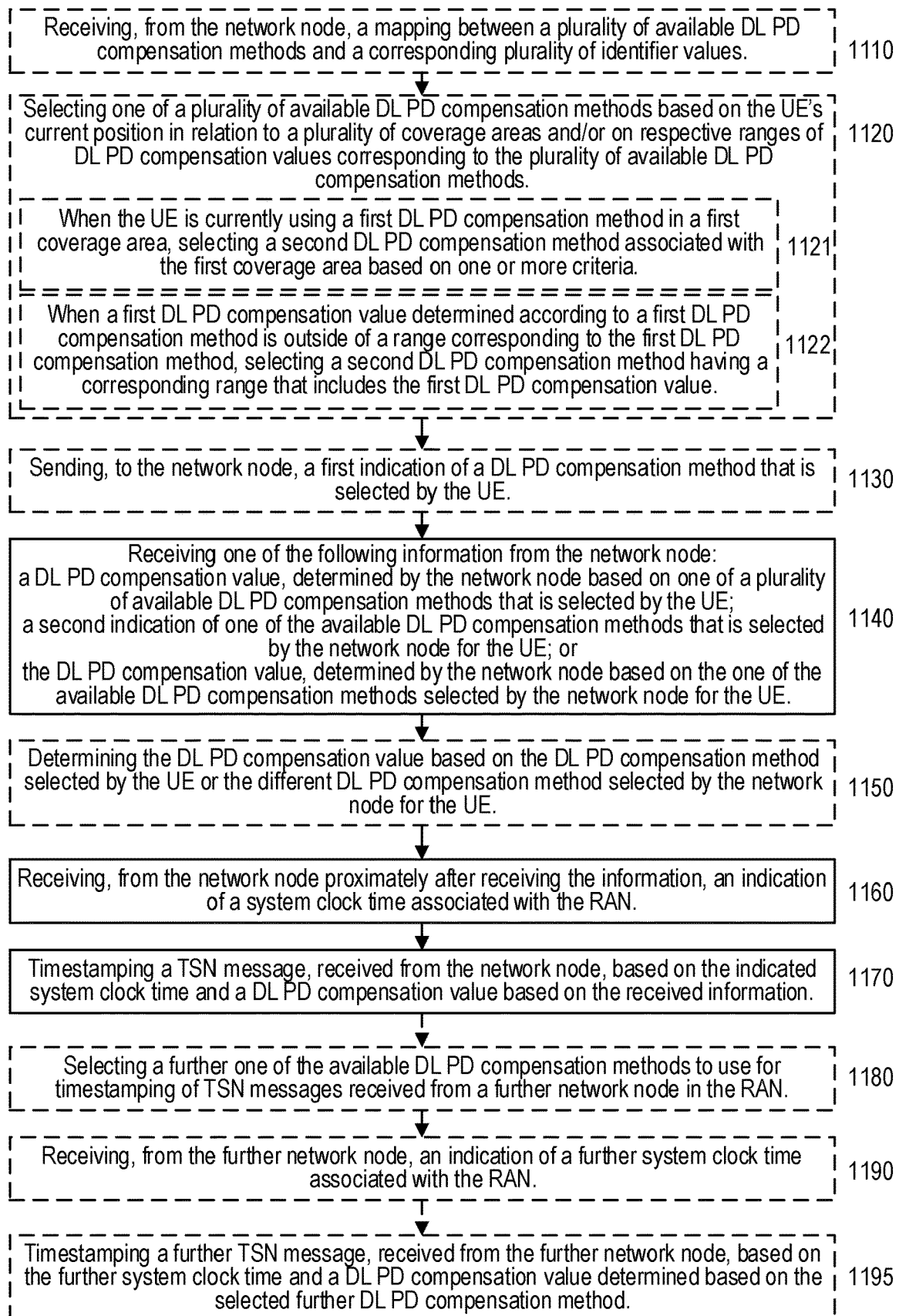
FIG. 11 shows a flow diagram illustrating an exemplary method (e.g., procedure) for a user equipment (UE, e.g., wireless device), according to various exemplary embodiments of the present disclosure.

These embodiments described above can be further illustrated with reference to FIGS. 10-11, which depict exemplary methods (e.g., procedures) performed by a network node and a UE, respectively. Put differently, various features of the operations described below correspond to various embodiments described above. The exemplary methods shown in FIGS. 10-11 can be used cooperatively to provide various benefits, advantages, and/or solutions to problems described herein. Although the exemplary methods are illustrated in FIGS. 10-11 by specific blocks in particular orders, the operations corresponding to the blocks can be performed in different orders than shown and can be combined and/or divided into blocks having different functionality than shown. Optional blocks and/or operations are indicated by dashed lines.

In particular, FIG. 10 illustrates an exemplary method (e.g., procedure) for supporting timestamping of time-sensitive network (TSN) messages received by a user equipment (UE), according to various embodiments of the present disclosure. The exemplary method can be performed by a network node (e.g., base station, eNB, gNB, etc., or component thereof) serving the UE in a radio access network (RAN, e.g., E-UTRAN, NG-RAN), such as network nodes as described elsewhere herein.

The exemplary method illustrated in FIG. 10 can include the operations of block 1060, in which the network node can sending one of the following information to the UE for use in relation to timestamping of TSN messages received by the UE:

- a second indication of one of a plurality of available downlink (DL) propagation delay (PD) compensation methods that is selected by the network node for the UE;
- a DL PD compensation value, determined by the network node based on one of a plurality of available DL PD compensation methods that is selected by the UE; or
- the DL PD compensation value, determined by the network node based on a different one of the available DL PD compensation methods that is selected by the network node for the UE.

The exemplary method can also include the operations of block 1070, in which the network node can send, to the UE proximately after sending the information, an indication of a system clock time associated with the RAN, wherein the system clock time is to be compensated by the UE based on the information (e.g., sent in block 1060).

As discussed above and as used herein, "proximately before" generally means a small time offset (or duration) between the earlier event and the later event. However, "proximately before" is not required to be "immediately before." Rather, as used herein, the term means that the earlier event should precede the later event by as short of duration as necessary, required, practical, and/or technically feasible under the prevailing circumstances and/or conditions.

The term "proximately after" generally carries the same meaning as "proximately before", except that it is from the perspective of the later event rather than the earlier event. More specifically, the term means that the later event should follow the earlier event by as short of duration as necessary, required, practical, and/or technically feasible under the prevailing circumstances and/or conditions.

In some embodiments, the exemplary method can also include the operations of block 1080, in which the network node can send, to the UE proximately after sending the indication of system clock time, a TSN message indicating a time associated with a grandmaster clock of the TSN (TSN GM). In some of these embodiments, at least one of the following applies:

- the information is sent no earlier than a first duration before sending the indication of the system clock time, and
- the indication of the system clock time is sent no earlier than a second duration before sending the TSN message.

In such embodiments, the exemplary method can also include the operations of block 1050, in which the network node can determining at least one of the first and second durations based on one or more of the following:

- TSN timing accuracy requirements of a TSN end station connected to the UE;
- the UE's current location and/or movement in a cell served by the network node;
- radio propagation conditions in the cell;
- network node measurements of UE uplink (UL) transmissions;
- UE measurements of network node DL transmissions;
- UE processing capabilities in relation to at least one of the information, the indication of the system clock time, and the TSN message; and
- scheduled transmissions of at least one of the indication of the system clock time and the TSN message.

In some of these embodiments, the TSN message is one of a plurality of periodic TSN GM signalling events pertaining to an end station associated with the UE and the indication of the system clock time is one of a corresponding plurality of periodic indications of system clock time sent to the UE. In such embodiments, each indication of system clock time is sent at a same duration before a corresponding TSM GM signaling event.

In some embodiments, the exemplary method can also include the operations of block 1020, in which the network node can receive, from the UE, a first indication of the DL PD compensation method that is selected by the UE. In such embodiments, the information is sent to the UE (e.g., in block 1060) in response to the first indication. In some embodiments, the second indication (e.g., sent in block 1060) indicates a different DL PD compensation method than indicated by the first indication.

In some embodiments, the exemplary method can also include the operations of block 1040, in which the network node can determine the DL PD compensation value based on the DL PD compensation method selected by the UE or the different DL PD compensation method selected by the network node for the UE. For example, this determined value can be sent to the UE in block 1060.

In some embodiments, the indication of system clock time can be sent via broadcast system information or unicast signaling to the UE, and the information can be sent via unicast signaling to the UE.

In various embodiments, the plurality of available DL PD compensation methods can include at least two of the following: zero compensation; fixed non-zero compensation of a first amount; fixed non-zero compensation of a second amount; and variable compensation based on round-trip-time (RTT) of signal propagation between UE and network node.

In some embodiments, the exemplary method can also include the operations of block 1030, where the network node can select one of the plurality of available DL PD compensation methods for the UE based on the UE's current position in relation to a plurality of coverage areas of the network node and/or on respective ranges of DL PD compensation values corresponding to the plurality of available DL PD compensation methods.

In some of these embodiments, the selecting operations in block 1030 can include the operations of sub-block 1031, where the network node can, when the UE is currently using a first DL PD compensation method in a first coverage area served by the network node, select a second DL PD compensation method associated with the first coverage area based on one or more of the following:

- the UE's proximity to a second coverage area served by the network node;

difference between a first PD compensation value computed based on the first DL PD compensation method and a second PD compensation value computed based on the second DL PD compensation method;

difference between the first PD compensation value and a pre-defined threshold; and a rate of change of first PD compensation values determined based on the first DL PD compensation method.

An example of such embodiments is shown in FIG. 8.

In other of these embodiments, the selecting operations in block 1030 can include the operations of sub-block 1032, where the network node can, when a first DL PD compensation value determined according to a first DL PD compensation method is outside of a range corresponding to the first DL PD compensation method, select a second DL PD compensation method having a corresponding range that includes the first DL PD compensation value. An example of these embodiments is illustrated by Table 3 above.

In some embodiments, the exemplary method can also include the operations of block 1010, where the network node can configure the UE (e.g., via RRC) with a mapping between the plurality of available DL PD compensation methods and a corresponding plurality of identifier values. Tables 1 and 2 above show examples of such configurations. In such embodiments, the second indication (e.g., sent in block 1060) can include an identifier value associated with the DL PD compensation method selected by the network node. For example, the first indication can be sent via DCI with a two-bit identifier, such as illustrated in Tables 1-2.

In some of these embodiments, the mapping can also include an association between each available DL PD compensation method and one or more coverage areas of a cell served by the network node.

In addition, FIG. 11 illustrates an exemplary method (e.g., procedure) for timestamping of time-sensitive network (TSN) messages received by a user equipment (UE) served by a network node in a radio access network (RAN), according to various exemplary embodiments of the present disclosure. For example, the exemplary method shown in FIG. 11 can be implemented in a UE or wireless device configured as described elsewhere herein.

The exemplary method illustrated in FIG. 11 can include the operations of block 1140, in which the UE can receive one of the following information from the network node:
- a second indication of one of a plurality of available downlink (DL) propagation delay (PD) compensation methods that is selected by the network node for the UE;
- a DL PD compensation value, determined by the network node based on one of a plurality of available DL PD compensation methods that is selected by the UE; or
- the DL PD compensation value, determined by the network node based on a different one of the available DL PD compensation methods that is selected by the network node for the UE.

The exemplary method can also include the operations of block 1160, where the UE can receive, from the network node proximately after receiving the information, an indication of a system clock time associated with the RAN. The exemplary method can also include the operations of block 1170, where the UE can timestamp a TSN message, received from the network node, based on the indicated system clock time and a DL PD compensation value determined using the received information.

In some embodiments, the TSN message indicates a time associated with a grandmaster clock of the TSN (TSN GM), and the indication of the system clock time is received (e.g., in block 1160) proximately before the TSN message. In some of these embodiments, the TSN message is one of a plurality of periodic TSN GM signalling events pertaining to an end station associated with the UE and the indication of the system clock time is one of a corresponding plurality of periodic indications of system clock time received by the UE. In such embodiments, each indication of system clock time is received at a same duration before a corresponding TSM GM signaling event.

In some embodiments, the exemplary method can also include the operations of block 1130, in which the network node can send, to the network node, a first indication of the DL PD compensation method that is selected by the UE. In such embodiments, the information is received from the network node (e.g., in block 1140) in response to the first indication. In some embodiments, the second indication (e.g., received in block 1140) indicates a different DL PD compensation method than indicated by the first indication.

In some embodiments, the exemplary method can also include the operations of block 1150, in which UE can determine the DL PD compensation value based on the DL PD compensation method selected by the UE or the different DL PD compensation method selected by the network node for the UE. For example, this determined value can be used for the timestamping operation in block 1170. In some embodiments, determining the DL PD compensation value in block 1150 can be further based on UE adjustments to timing of UL transmissions and/or DL PD information provided by the network node.

In some embodiments, the indication of system clock time can be received from the network node via broadcast system information or unicast signaling, and the information can be received from the network node via unicast signaling.

In various embodiments, the plurality of available DL PD compensation methods can include at least two of the following: zero compensation; fixed non-zero compensation of a first amount; fixed non-zero compensation of a second amount; and variable compensation based on round-trip-time (RTT) of signal propagation between UE and network node.

In some embodiments, the exemplary method can also include the operations of block 1120, where the UE can select one of the plurality of available DL PD compensation methods based on the UE's current position in relation to a plurality of coverage areas of the network node and/or on respective ranges of DL PD compensation values corresponding to the plurality of available DL PD compensation methods.

In some of these embodiments, the selecting operations in block 1120 can include the operations of sub-block 1121, where the UE can, when it is currently using a first DL PD compensation method in a first coverage area served by the network node, select a second DL PD compensation method associated with the first coverage area based on one or more of the following:
- the UE's proximity to a second coverage area served by the network node;
- difference between a first PD compensation value computed based on the first DL PD compensation method and a second PD compensation value computed based on the second DL PD compensation method;
- difference between the first PD compensation value and a pre-defined threshold; and a rate of change of first PD compensation values determined based on the first DL PD compensation method.

An example of such embodiments is shown in FIG. 8.

In other of these embodiments, the selecting operations in block 1120 can include the operations of sub-block 1122, where the UE can, when a first DL PD compensation value determined according to a first DL PD compensation method is outside of a range corresponding to the first DL PD compensation method, select a second DL PD compensation method having a corresponding range that includes the first DL PD compensation value. An example of these embodiments is illustrated by Table 3 above.

In some embodiments, the exemplary method can also include the operations of block 1110, where the UE can receive, from the network node (e.g., via RRC), a mapping between the plurality of available DL PD compensation methods and a corresponding plurality of identifier values. Tables 1 and 2 above show examples of such mappings. In such embodiments, the second indication (e.g., received in block 1140) can include an identifier value associated with the DL PD compensation method selected by the network node. For example, the second indication can be sent via DCI with a two-bit identifier, such as illustrated in Tables 1-2.

In some of these embodiments, the mapping can also include an association between each available DL PD compensation method and one or more coverage areas of a cell served by the network node.

In some embodiments, the exemplary method can also include the operations of blocks 1180-1195. In block 1180, the UE can select a further one of the available DL PD compensation methods to use in relation to timestamping of TSN messages received from a further network node in the RAN. In block 1190, the UE can receive, from the further network node, an indication of a further system clock time associated with the RAN. In block 1195, the UE can timestamp a further TSN message, received from the further network node, based on the further system clock time and a DL PD compensation value determined based on the selected further DL PD compensation method.

In some of these embodiments, the network node and the further network node are associated with different system clock domains of the RAN and one of the following applies:
the UE is in multi-connectivity with the network node and the further network node; or
the UE is handed over from the network node to the further network node.

Figure 12:
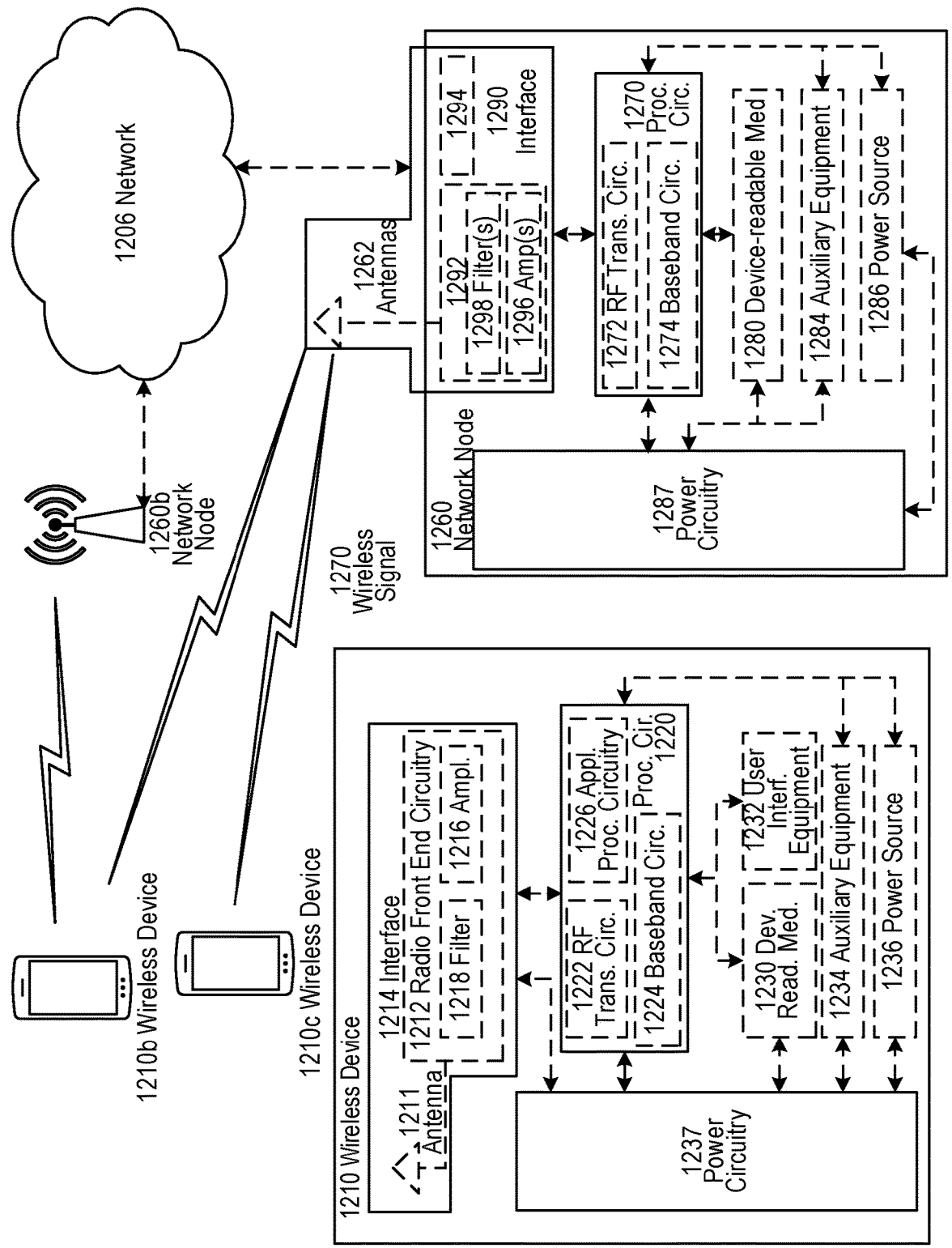
FIG. 12 illustrates an exemplary wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and a RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1260, either alone or in conjunction with other network node 1260 components (e.g., device readable medium 1280). Such functionality can include any of the various wireless features, functions, or benefits discussed herein.

For example, processing circuitry 1270 can execute instructions stored in device readable medium 1280 or in memory within processing circuitry 1270. In some embodiments, processing circuitry 1270 can include a system on a chip (SOC). As a more specific example, instructions (also referred to as a computer program product) stored in medium 1280 can include instructions that, when executed by processing circuitry 1270, can configure network node 1260 to perform operations corresponding to various exemplary methods (e.g., procedures) described herein.

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 12 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

In some embodiments, a wireless device (WD, e.g., WD 1210) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and can be configured to condition signals communicated between antenna 1211 and processing circuitry 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1210 functionality either alone or in combination with other WD 1210 components, such as device readable medium 1230. Such functionality can include any of the various wireless features or benefits discussed herein.

For example, processing circuitry 1220 can execute instructions stored in device readable medium 1230 or in memory within processing circuitry 1220 to provide the functionality disclosed herein. More specifically, instructions (also referred to as a computer program product) stored in medium 1230 can include instructions that, when executed by processor 1220, can configure wireless device 1210 to perform operations corresponding to various exemplary methods (e.g., procedures) described herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210 and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 13:
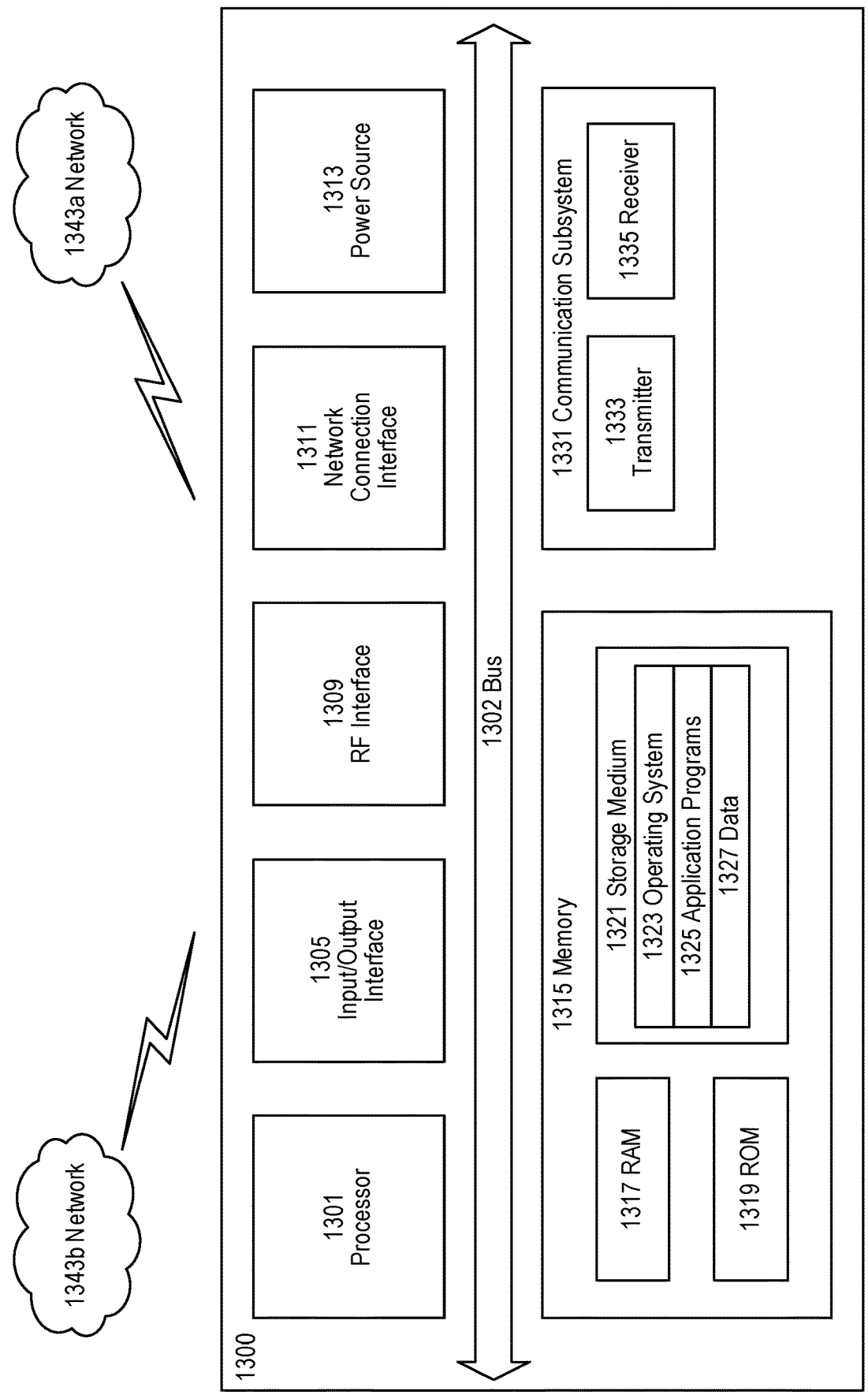
FIG. 13 illustrates an exemplary UE, according to various exemplary embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 13200 can be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 13, or only a subset of the components. The level of integration between the components can vary from one UE to another UE. Further, certain UEs can contain multiple instances of a component, such as multiple processors, memories, transceivers, transmitters, receivers, etc.

In FIG. 13, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 13, RF interface 1309 can be configured to provide a communication interface to RF components such as a transmitter, a receiver, and an antenna. Network connection interface 1311 can be configured to provide a communication interface to network 1343a. Network 1343a can encompass wired and/or wireless networks such as a local-area network (LAN), a wide-area network (WAN), a computer network, a wireless network, a telecommunications network, another like network or any combination thereof. For example, network 1343a can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1321 can be configured to include operating system 1323; application program 1325 such as a web browser application, a widget or gadget engine or another application; and data file 1327. Storage medium 1321 can store, for use by UE 1300, any of a variety of various operating systems or combinations of operating systems. For example, application program 1325 can include executable program instructions (also referred to as a computer program product) that, when executed by processor 1301, can configure UE 1300 to perform operations corresponding to various exemplary methods (e.g., procedures) described herein.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 13, processing circuitry 1301 can be configured to communicate with network 1343b using communication subsystem 1331. Network 1343a and network 1343b can be the same network or networks or different network or networks. Communication subsystem 1331 can be configured to include one or more transceivers used to communicate with network 1343b. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343b can encompass wired and/or wireless networks such as a local-area network (LAN), a wide-area network (WAN), a computer network, a wireless network, a telecommunications network, another like network or any combination thereof. For example, network 1343b can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 14:
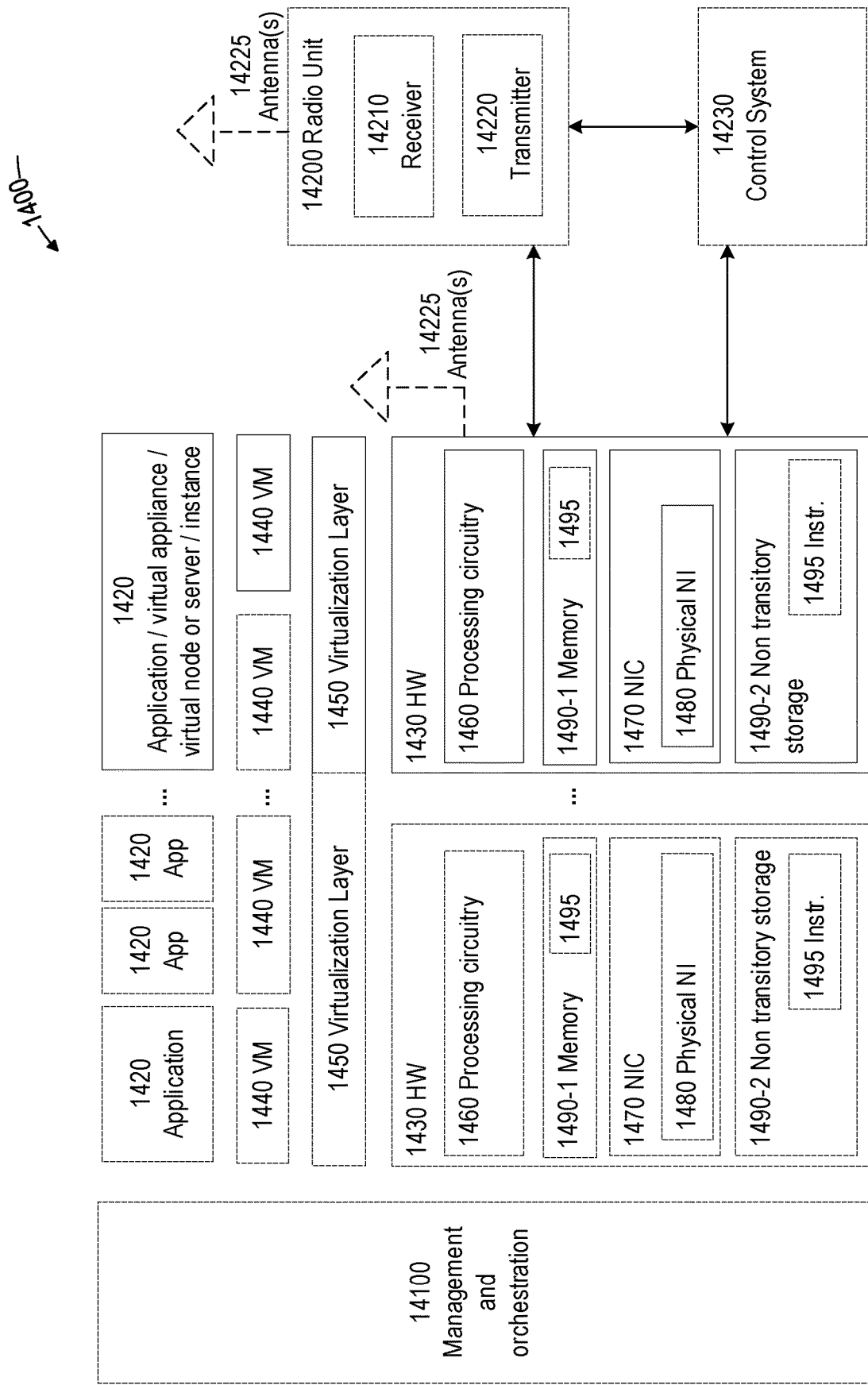
FIG. 14 is a block diagram illustrating an exemplary virtualization environment usable for implementing various exemplary embodiments of the present disclosure.

FIG. 14 is a schematic block diagram illustrating a virtualization environment 1400 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized. The functions can be implemented by one or more applications 1420 (which can alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400 can include general-purpose or special-purpose network hardware devices (or nodes) 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. For example, instructions 1495 can include program instructions (also referred to as a computer program product) that, when executed by processing circuitry 1460, can configure hardware node 1420 to perform operations corresponding to various exemplary methods (e.g., procedures) described herein. Such operations can also be attributed to virtual node(s) 1420 that is/are hosted by hardware node 1430.

Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460. Software 1495 can include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 14, hardware 1430 can be a standalone network node with generic or specific components. Hardware 1430 can comprise antenna 14225 and can implement some functions via virtualization. Alternatively, hardware 1430 can be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 can be coupled to one or more antennas 14225. Radio units 14200 can communicate directly with hardware nodes 1430 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 14230, which can alternatively be used for communication between the hardware nodes 1430 and radio units 14200.

Figure 15:
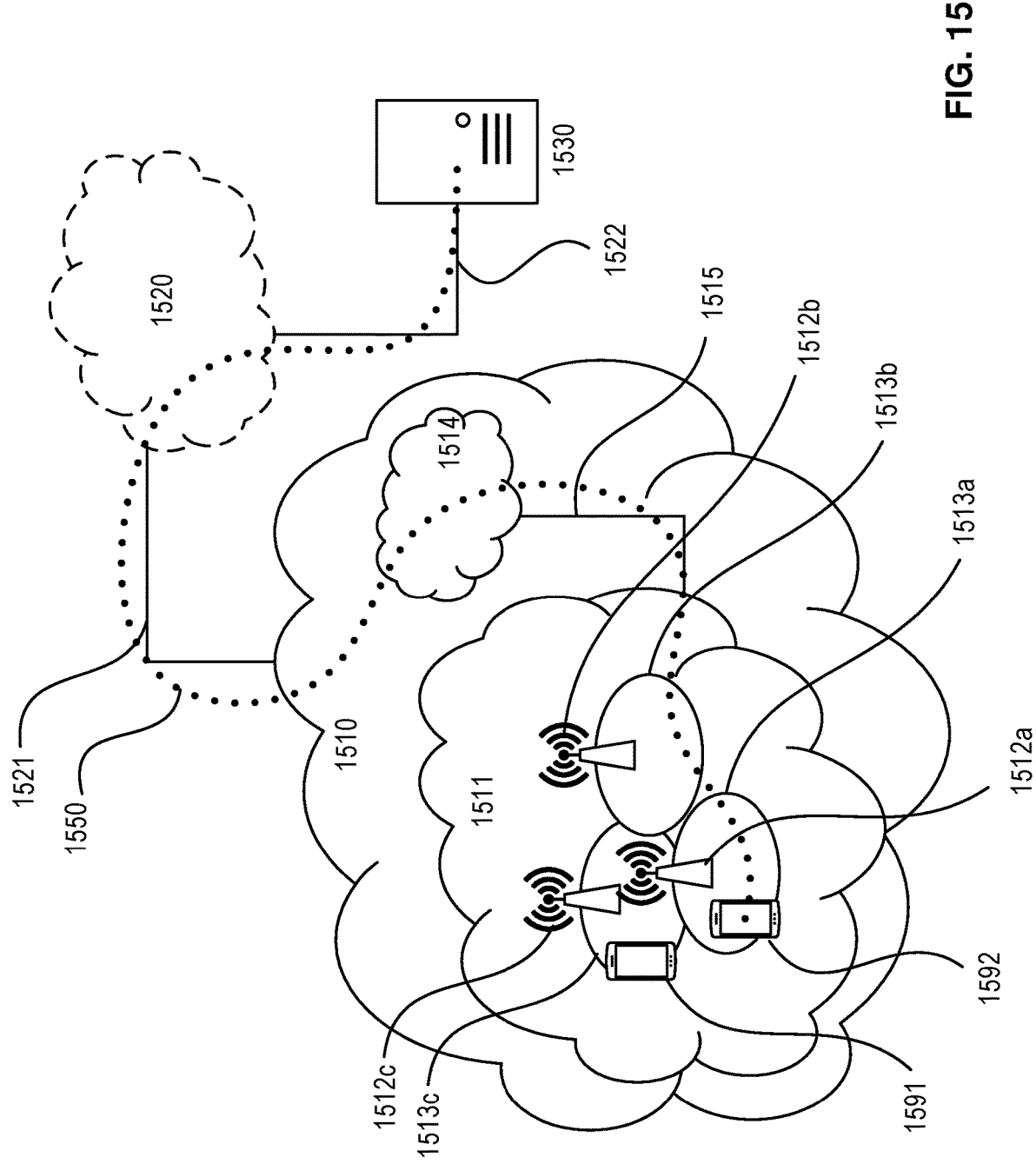
FIGS. 15-16 are block diagrams of exemplary communication systems and/or networks, according to various exemplary embodiments of the present disclosure.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c can be configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct, or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions.

Base station 1620 also includes software 1621 stored internally or accessible via an external connection. For example, software 1621 can include program instructions (also referred to as a computer program product) that, when executed by processing circuitry 1628, can configure base station 1620 to perform operations corresponding to various exemplary methods (e.g., procedures) described herein.

Communication system 1600 can also include UE 1630 already referred to, whose hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions.

UE 1630 also includes software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides. Software 1631 can also include program instructions (also referred to as a computer program product) that, when executed by processing circuitry 1638, can configure UE 1630 to perform operations corresponding to various exemplary methods (e.g., procedures) described herein.

Figure 16:
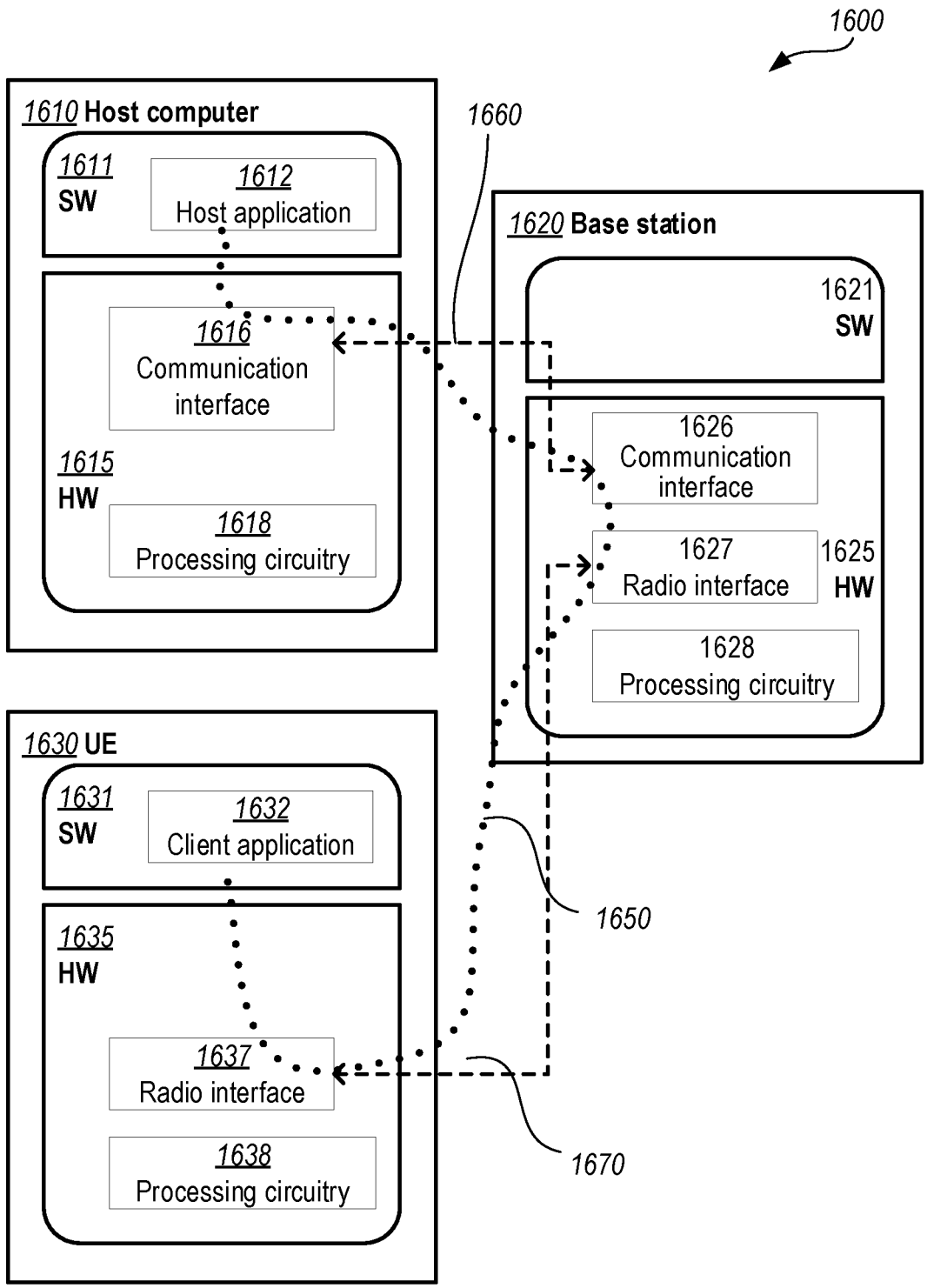

As an example, host computer 1610, base station 1620 and UE 1630 illustrated in FIG. 16 can be similar or identical to host computers or base stations described in relation to other figures herein. For example, the inner workings of these entities can be as shown in FIG. 16 and independently, the surrounding network topology can be that shown in other figures herein.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors, etc.

FIG. 17 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 17 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

E1. A method, for a network node in a radio access network (RAN), for supporting timestamping of time-sensitive network (TSN) messages received by a user equipment (UE) served by the network node, the method comprising:
selecting one of a plurality of available downlink (DL) propagation delay (PD) compensation methods for the UE to use in relation to timestamping of TSN messages received by the UE;
sending, to the UE, a first indication of the selected DL PD compensation method; and
sending, to the UE, a second indication of a system clock time associated with the RAN, wherein the first indication is sent proximately before the second indication.

E2. The method of embodiment E1, further comprising sending, to the UE, a TSN message indicating a time associated with a grandmaster clock of the TSN (TSN GM), wherein the second indication is sent proximately before the TSN message.

E3. The method of embodiment E2, further comprising determining at least one of a duration between the first and second indications and a duration between the second indication and the TSN message based on one or more of the following:
TSN timing accuracy requirements of a TSN end station connected to the UE;
the UE's current location and/or movement in a cell served by the network node;
radio propagation conditions in the cell;
network node measurements of UE uplink (UL) transmissions;
UE measurements of network node DL transmissions;
UE processing capabilities in relation to the first indication, the second indication, and/or the TSN message; and
scheduled transmissions of the second indication and/or the TSN message.

E4. The method of any of embodiments E1-E3, further comprising receiving, from the UE, a request for an update of DL PD compensation method applicable to the UE.

E5. The method of embodiment E4, wherein:
- the request includes an indication of a UE-selected one of the available DL PD compensation methods, and
- the first indication indicates either the UE-selected method or a different one of the available methods selected by the network node.

E6. The method of any of embodiments E1-E5, wherein:
- the second indication is sent via broadcast system information or unicast signaling to the UE; and
- the first indication is sent via unicast signaling to the UE.

E7. The method of any of embodiments E1-E6, wherein the plurality of available DL PD compensation methods includes at least two of the following:
- zero compensation;
- fixed non-zero compensation of a first amount;
- fixed non-zero compensation of a second amount; and
- variable compensation based on round-trip-time (RTT) of signal propagation between UE and network node.

E8. The method of any of embodiments E1-E7, wherein:
- the network node serves a cell comprising a plurality of coverage areas; and
- each of the coverage areas is associated with a subset of the available DL PD compensation methods.

E9. The method of embodiment E8, wherein selecting the one of the plurality of available DL PD compensation methods is based on the UE's current position in relation to the plurality of coverage areas.

E10. The method of any of embodiments E8-E9, wherein selecting the one of the plurality of available DL PD compensation methods comprises, when the UE is currently using a first DL PD compensation method in a first coverage area, selecting a second DL PD compensation method associated with the first coverage area based on one or more of the following:
- the UE's proximity to a second coverage area;
- difference between a first PD compensation value computed based on the first DL PD compensation method and a second PD compensation value computed based on the second DL PD compensation method;
- difference between the first PD compensation value and a pre-defined threshold; and
- a rate of change of first PD compensation values determined based on the first DL PD compensation method.

E11. The method of any of embodiments E1-E10, wherein:
- the method further comprises configuring the UE with the plurality of available DL PD compensation methods, each in association with a different identifier value; and
- the first indication includes an identifier value associated with the DL PD compensation method selected by the network node.

E12. A method, for a user equipment (UE) served by a network node in a radio access network (RAN), for timestamping of time-sensitive network (TSN) messages received by the UE, the method comprising:
- selecting one of a plurality of available downlink (DL) propagation delay (PD) compensation methods to use in relation to timestamping of TSN messages received by the UE;
- receiving, from the network node proximately after selecting the one of the plurality of available DL PD compensation methods, a second indication of a system clock time associated with the RAN; and
- timestamping a received TSN message based on the received system clock time and a DL PD compensation value determined based on the selected DL PD compensation method.

E13. The method of embodiment E12, wherein:
- the TSN message indicates a time associated with a grandmaster clock of the TSN (TSN GM); and
- the second indication is received proximately before the TSN message.

E14. The method of any of embodiments E12-E13, wherein:
- selecting the one of the plurality of available DL PD compensation methods is based on receiving, from the network node, a first indication of a DL PD compensation method selected by the network node for the UE;
- the first indication is received proximately before the second indication.

E15. The method of embodiment E14, further comprising sending, to the network node, a request for an update of DL PD compensation method applicable to the UE.

E16. The method of embodiment E15, wherein:
- the request includes an indication of a UE-selected one of the available DL PD compensation methods, and
- the first indication indicates either the UE-selected method or a different one of the available methods selected by the network node.

E17. The method of any of embodiments E14-E16, wherein:
- the method further comprises receiving, from the network node, a configuration of the plurality of available DL PD compensation methods, each in association with a different identifier value; and
- the first indication includes an identifier value associated with the DL PD compensation method selected by the network node.

E18. The method of any of embodiments E14-E17, wherein
- the second indication is received via broadcast system information or unicast signaling from the network node; and
- the first indication is received via unicast signaling from the network node.

E19. The method of any of embodiments E12-E13, wherein:
- the UE is operating in a cell, served by the network node, comprising a plurality of coverage areas; and
- each of the coverage areas is associated with a subset of the available DL PD compensation methods.

E20. The method of embodiment E19, wherein selecting the one of the plurality of available DL PD compensation methods is based on the UE's current position in relation to the plurality of coverage areas.

E21. The method of any of embodiments E19-E20, wherein selecting the one of the plurality of available DL PD compensation methods comprises, when the UE is currently using a first DL PD compensation method in a first coverage area, selecting a second DL PD compensation method associated with the first coverage area based on one or more of the following:
- the UE's proximity to a second coverage area;
- difference between a first PD compensation value computed based on the first DL PD compensation method and a second PD compensation value computed based on the second DL PD compensation method;
- difference between the first PD compensation value and a pre-defined threshold; and
- a rate of change of first PD compensation values determined based on the first DL PD compensation method.

E22. The method of any of embodiments E12-E13, wherein:
- the method further comprises receiving, from the network node, a configuration of the plurality of available DL PD compensation methods, each in association with a corresponding range of applicable DL PD values; and selecting the one of the plurality of available DL PD compensation methods comprises, when a first DL PD compensation value determined according to a first DL PD compensation method is outside of a range corresponding to the first DL PD compensation method, selecting a second DL PD compensation method having a corresponding range that includes the first DL PD compensation value.

E23. The method of any of embodiments E12-E22, wherein the plurality of available DL PD compensation methods includes at least two of the following:
  zero compensation;
  fixed non-zero compensation of a first amount;
  fixed non-zero compensation of a second amount; and
  variable compensation based on round-trip-time (RTT) of signal propagation between UE and network node.

E24. The method of embodiment E23, wherein:
  the selected DL PD compensation method is variable compensation based on RTT; and
  the method further comprises determining the DL PD compensation value based on one or more of the following:
    UE adjustments to timing of UL transmissions; and E25. A network node, in a radio access network (RAN), configured to support timestamping of time-sensitive network (TSN) messages received by a user equipment (UE) served by the network node, the network node comprising:
  communication interface circuitry configured to communicate with the UE; and
  processing circuitry operably coupled with the communication interface circuitry, whereby the processing circuitry and the communication interface circuitry are configured to perform operations corresponding to any of the methods of embodiments E1-E11.

E26. A network node, in a radio access network (RAN), configured to support timestamping of time-sensitive network (TSN) messages received by a user equipment (UE) served by the network node, the network node being further arranged to perform operations corresponding to any of the methods of embodiments E1-E11.

E27. A non-transitory, computer-readable medium storing program instructions that, when executed by processing circuitry of a network node configured to support timestamping of time-sensitive network (TSN) messages received by a user equipment (UE) served by the network node, configure the network node to perform operations corresponding to any of the methods of embodiments E1-E11.

E28. A computer program product comprising program instructions that, when executed by processing circuitry of a network node configured to support timestamping of time-sensitive network (TSN) messages received by a user equipment (UE) served by the network node, configure the network node to perform operations corresponding to any of the methods of embodiments E1-E11.

E29. A user equipment (UE) configured for timestamping of time-sensitive network (TSN) messages received by the UE, the UE comprising:
  radio interface circuitry configured to communicate with a network node in a radio access network (RAN), for; and
  processing circuitry operably coupled to the radio interface circuitry, whereby the processing circuitry and the radio interface circuitry are configured to perform operations corresponding to any of the methods of embodiments E12-E24.

E30. A user equipment (UE) configured for timestamping of time-sensitive network (TSN) messages received by the UE, the UE being further arranged to perform operations corresponding to any of the methods of embodiments E12-E24.

E31. A non-transitory, computer-readable medium storing program instructions that, when executed by processing circuitry of a user equipment (UE) configured for timestamping of time-sensitive network (TSN) messages received by the UE, configure the UE to perform operations corresponding to any of the methods of embodiments E12-E24.

E32. A computer program product comprising program instructions that, when executed by processing circuitry of a user equipment (UE) configured for timestamping of time-sensitive network (TSN) messages received by the UE, configure the UE to perform operations corresponding to any of the methods of embodiments E12-E24.

The invention claimed is:

1. A method, performed by a network node in a radio access network (RAN), for supporting timestamping of time-sensitive network (TSN) messages received by a user equipment (UE) served by the network node, the method comprising:
  receiving, from the UE, a first indication of a downlink propagation delay (DL PD) compensation method that is selected by the UE;
  in response to the first indication, sending one of the following information to the UE for use in relation to timestamping of TSN messages received by the UE:
    a second indication of one of a plurality of available DL PD compensation methods that is selected by the network node for the UE;
    a DL PD compensation value, determined by the network node based on the DL PD compensation method that is selected by the UE; or
    the DL PD compensation value, determined by the network node based on a different one of the available DL PD compensation methods that is selected by the network node for the UE; and
  sending, to the UE proximately after sending the information, an indication of a system clock time associated with the RAN, wherein the system clock time is to be compensated by the UE based on the information.

2. The method of claim 1, further comprising sending, to the UE proximately after sending the indication of system clock time, a TSN message indicating a time associated with a grandmaster clock of the TSN (TSN GM).

3. The method of claim 2, wherein:
  at least one of the following applies:
    the information is sent no earlier than a first duration before sending the indication of the system clock time, and
    the indication of the system clock time is sent no earlier than a second duration before sending the TSN message; and
  the method further comprises determining at least one of the first and second durations based on one or more of the following:
    TSN timing accuracy requirements of a TSN end station connected to the UE;
    the UE's current location and/or movement in a cell served by the network node;
    radio propagation conditions in the cell;

network node measurements of UE uplink transmissions;

UE measurements of network node DL transmissions;

UE processing capabilities in relation to at least one of the following: the information, the indication of the system clock time, and the TSN message; and scheduled transmissions of at least one of the indication of the system clock time and the TSN message.

4. The method of claim 1, wherein the second indication indicates a different DL PD compensation method than indicated by the first indication.

5. The method of claim 1, further comprising determining the DL PD compensation value based on the DL PD compensation method selected by the UE or on the different DL PD compensation method selected by the network node for the UE.

6. The method of claim 1, further comprising selecting one of the plurality of available DL PD compensation methods for the UE based on one or more of the following:
   the UE's current position in relation to a plurality of coverage areas of the network node; and
   respective ranges of DL PD compensation values corresponding to the plurality of available DL PD compensation methods.

7. The method of claim 1, wherein:
   the method further comprises configuring the UE with a mapping between the plurality of available DL PD compensation methods and a corresponding plurality of identifier values; and
   the second indication includes one of the identifier values that corresponds to the DL PD compensation method selected by the network node.

8. A method performed by a user equipment (UE) for timestamping of time-sensitive network (TSN) messages received by the UE in a radio access network (RAN), the method comprising:
   sending, to a network node in the RAN, a first indication of a downlink propagation delay (DL PD) compensation method that is selected by the UE;
   in response to the first indication, receiving one of the following information from the network node:
      a second indication of one of a plurality of available DL PD compensation methods that is selected by the network node for the UE;
      a DL PD compensation value, determined by the network node based on the DL PD compensation method that is selected by the UE; or
      the DL PD compensation value, determined by the network node based on a different one of the available DL PD compensation methods that is selected by the network node for the UE; and
   receiving, from the network node proximately after receiving the information, an indication of a system clock time associated with the RAN; and
   timestamping a TSN message, received from the network node, based on the indicated system clock time and a DL PD compensation value determined using the received information.

9. The method of claim 8, wherein:
   the TSN message indicates a time associated with a grandmaster clock of the TSN (TSN GM); and
   the indication of the system clock time is received proximately before the TSN message.

10. The method of claim 8, wherein the second indication indicates a different DL PD compensation method than indicated by the first indication.

11. The method of claim 8, further comprising determining the DL PD compensation value used for the timestamping, based on the DL PD compensation method selected by the UE or on the different DL PD compensation method selected by the network node for the UE.

12. The method of claim 11, wherein determining the DL PD compensation value is further based on one or more of the following: UE adjustments to timing of UL transmissions, and DL PD information provided by the network node.

13. The method of claim 8, further comprising selecting one of the plurality of available DL PD compensation methods based on one or more of the following:
   the UE's current position in relation to a plurality of coverage areas of the network node; and
   respective ranges of DL PD compensation values corresponding to the plurality of available DL PD compensation methods.

14. The method of claim 8, wherein:
   the method further comprises receiving, from the network node, a mapping between the plurality of available DL PD compensation methods and a corresponding plurality of identifier values; and
   the second indication includes one of the identifier values that corresponds to the DL PD compensation method selected by the network node.

15. A user equipment (UE) configured for timestamping of time-sensitive network (TSN) messages received by the UE in a radio access network (RAN), the UE comprising:
   radio interface circuitry configured to communicate with a network node in the RAN; and
   processing circuitry operably coupled to the radio interface circuitry, whereby the processing circuitry and the radio interface circuitry are configured to perform operations corresponding to the method of claim 8.

16. The UE of claim 15, wherein:
   the second indication indicates a different DL PD compensation method than indicated by the first indication.

17. A network node configured to support timestamping of time-sensitive network (TSN) messages received by a user equipment (UE) served by the network node in a radio access network (RAN), the network node comprising:
   communication interface circuitry configured to communicate with the UE; and
   processing circuitry operably coupled with the communication interface circuitry, whereby the processing circuitry and the communication interface circuitry are configured to:
      receive, from the UE, a first indication of a downlink propagation delay (DL PD) compensation method that is selected by the UE;
      in response to the first indication, send one of the following information to the UE for use in relation to timestamping of TSN messages received by the UE:
         a second indication of one of a plurality of available DL PD compensation methods that is selected by the network node for the UE;
         a DL PD compensation value, determined by the network node based on the DL PD compensation method that is selected by the UE; or
         the DL PD compensation value, determined by the network node based on a different one of the available DL PD compensation methods that is selected by the network node for the UE; and
      send, to the UE proximately after sending the information, an indication of a system clock time associated with the RAN, wherein the system clock time is to be compensated by the UE based on the information.

18. The network node of claim 17, wherein:
the second indication indicates a different DL PD compensation method than indicated by the first indication.

* * * * *